US012792343B2

(12) United States Patent
Howard et al.

(10) Patent No.: US 12,792,343 B2
(45) Date of Patent: Nov. 10, 2026

(54) SYSTEMS AND METHODS OF AUTOMATICALLY CONSTRUCTING DIRECTED ACYCLIC GRAPHS (DAGS)

(71) Applicant: C Squared IP Holdings LLC, Scottsdale, AZ (US)

(72) Inventors: Kevin D. Howard, Mesa, AZ (US); Matthew J. Smith, Charleston, SC (US)

(73) Assignee: C SQUARED IP HOLDINGS LLC, Scottsdale, AZ (US)

( * ) Notice: Subject to any disclaimer, the term of this patent is extended or adjusted under 35 U.S.C. 154(b) by 0 days.

(21) Appl. No.: 18/382,500

(22) Filed: Oct. 21, 2023

(65) Prior Publication Data

US 2024/0168758 A1 May 23, 2024

Related U.S. Application Data

(60) Provisional application No. 63/418,456, filed on Oct. 21, 2022.

(51) Int. Cl.
*G06F 9/44* (2018.01)
*G06F 8/41* (2018.01)
*G06F 8/74* (2018.01)

(52) U.S. Cl.
CPC ................ *G06F 8/74* (2013.01); *G06F 8/456* (2013.01)

(58) Field of Classification Search
None
See application file for complete search history.

(56) References Cited

U.S. PATENT DOCUMENTS

| | | | | |
|---|---|---|---|---|
| 10,496,514 | B2 | 12/2019 | Howard | |
| 2010/0183028 | A1 | 7/2010 | Howard et al. | |
| 2010/0325388 | A1 | 12/2010 | Howard | |
| 2013/0254751 | A1 | 9/2013 | Howard | |
| 2020/0081816 | A1 | 3/2020 | Howard | |
| 2020/0210162 | A1 | 7/2020 | Howard | |
| 2021/0073285 | A1 * | 3/2021 | Hunter ...................... | G06F 8/35 |

(Continued)

FOREIGN PATENT DOCUMENTS

| | | | | |
|---|---|---|---|---|
| CA | 2650143 C * | 6/2017 | ............... | G06F 9/46 |
| WO | WO-2015061239 A1 * | 4/2015 | ............ | G06F 8/451 |

OTHER PUBLICATIONS

CN114428743, Eng text (Year: 2022).*
CN 113626207, Eng text (Year: 2021).*

*Primary Examiner* — Insun Kang
(74) *Attorney, Agent, or Firm* — Skaar Ulbrich Macari, P.A.

(57) ABSTRACT

Systems and methods are presented that automatically construct a directed acyclic graph (DAG) workflow used to control and manage algorithms on multiple, disparate, cloud-based development and deployment platforms. DAG workflows are comprised of a set of simplified, fixed time-affecting linear pathways (STALPs). Algorithms are constructed using no-code/low-code methods that are then automatically decomposed into a set of markup or scripting language time-affecting linear pathways (M-S TALPs). Prediction polynomials that approximate advanced time and space complexity functions are created using M-S TALPs and are used for M-S TALP identification, optimization, efficiency, and performance enhancement on selected computing platforms.

20 Claims, 41 Drawing Sheets

(56) References Cited

U.S. PATENT DOCUMENTS

| | | | | |
|---|---|---|---|---|
| 2021/0142143 | A1* | 5/2021 | Howard | G06N 20/00 |
| 2023/0051527 | A1 | 2/2023 | Smith et al. | |
| 2023/0185544 | A1* | 6/2023 | Procopio | G06F 8/437<br>717/109 |
| 2023/0325319 | A1 | 10/2023 | Howard | |
| 2024/0004707 | A1* | 1/2024 | Wang | G06F 9/4893 |
| 2024/0119109 | A1 | 4/2024 | Howard | |

* cited by examiner

Calling Sequence: Script$_1$ to Process$_1$ to Process$_2$ to ... to Process$_n$ Client-Server System Decentralized
Client-Server System Decentralized Peer-to-Peer Ad Hoc System

190

$$Space\ Complexity\ Polynomial\ \ if\ s = \{3, 13, 31\} \text{ and } \mathrm{d} = \{2, 4, 6\}$$

$$Saved\ Terms = f_{term} = \{d^2, \mp d, 1.000\}, s_{min} = 1 \rightarrow$$

$$\mathcal{Z}_v(d) = s_{min} \times \sum_{i=1}^{3} f_{term_i} = d^2 + d + 1.000$$

or $$\mathcal{Z}_v(d) = s_{min} \times \sum_{i=1}^{3} f_{term_i} = d^2 - d + 1.000$$

Compare Plus Vs Minus Versions $$Plus, Error_{max} = max\left\{\frac{|1-3|}{1} \times 100, \frac{|3-7|}{3} \times 100, \ldots \frac{|13-21|}{13} \times 100\right\} = max\{200, 133.3, 61.54\} \rightarrow 200\%$$

✓ $$Minus, Error_{max} = max\left\{\frac{|1-1|}{1} \times 100, \frac{|3-3|}{3} \times 100, \ldots \frac{|13-13|}{13} \times 100\right\} = max\{0, 0, 0\} \rightarrow 0\%$$

$$\therefore \mathcal{Z}_v\ (d) = d^2 - d + 1.000$$

FIG. 14

201

| Example Input Dataset Size and Space | |
|---|---|
| *d-values* | *s*-values |
| 2 | 3 |
| 4 | 13 |
| 6 | 31 |

FIG. 14A

200

| Example Source Values Table | |
|---|---|
| *d-values* | *s*-values |
| 1 | 1.000 |
| 2 | 4.333 |
| 3 | 10.333 |

FIG. 14B

202

| Scaled *d-values* | Example Scaled Target Values | | | | | | |
|---|---|---|---|---|---|---|---|
| | ... | $s = d$ | $s = \log_2 d$ | $s = d$ | $s = d^{1.5}$ | $s = d^2$ | ... |
| 1 | ... | 0.000 | 000 | 1.000 | 1.000 | 1 | ... |
| 2 | ... | 0.693 | 1.000 | 2.000 | 2.828 | 4 | ... |
| 3 | ... | 1.099 | 1.585 | 3.000 | 5.196 | 9 | ... |
| ... | ... | ... | ... | ... | ... | .... | ... |
| n | ... | $\log_e n$ | $\log_2 n$ | $n$ | $n^{1.5}$ | $n^2$ | ... |

Function Terms as Column Header

FIG. 14C

203

| New Source Values | |
|---|---|
| *d-values* | $s_S - s_T$ |
| 1 | $\lvert s_{S_1} - s_{T_1} \rvert$ |
| 2 | $\lvert s_{S_2} - s_{T_2} \rvert$ |
| ... | ... |
| n | $\lvert s_{S_n} - s_{T_n} \rvert$ |

FIG. 14D

| Source Values After Subtraction | |
|---|---|
| *d-values* | *s-values* |
| 1 | 0 |
| 2 | $s_1$ |
| ... | ... |
| n | $s_n$ |

→

| Source Values After Subtraction | |
|---|---|
| *d-values* | *s-values* |
| 1 | $s_1$ |
| 2 | 2 |
| ... | ... |
| n-1 | $s_{n-1}$ |

204

FIG. 14E

205

Closest Column – Negative Value Subtraction Results, Following Term Negative

| Comparison Source Values Versus Target Values | | | | |
|---|---|---|---|---|
| Source Values Table d-values | Target Values Table Column Polynomial Terms | Row 1 | Row 2 | Row 4 |
| {1, 2, 4} | | 1.000 | 3.000 | 13.000 |
| | $s = \log_e d$ | 0.000 | 0.693 | 1.363 |
| | $s = \log_2 d$ | 0.000 | 1.000 | 2.000 |
| | $s = d$ | 1.000 | 2.000 | 4.000 |
| | $s = d^{1.5}$ | 1.000 | 2.828 | 5.196 |
| | | 1.000 | 4.000 | [illegible] |

Found Term $f_{term} = \{d^2\}$

| Comparison Source Values Versus Target Values | | | | |
|---|---|---|---|---|
| Source Values Table d-values | Target Values Table Column Polynomial Terms | Row 1 | Row 2 | Row 4 |
| {1, 2, 4} | | 0.000 | 3.000 | 13.000 |
| | $s = d^2$ | 1.000 | 0.693 | 1.363 |
| | $s = \log_e d$ | 0.000 | 1.000 | 2.000 |
| | $s = \log_2 d$ | 0.000 | 2.000 | 4.000 |
| | $s = d$ | 1.000 | 2.828 | 5.196 |
| | $s = d^2$ | 1.000 | 4.000 | 16.000 |

| Comparison Source Values Versus Target Values | | | |
|---|---|---|---|
| Source Values Table d-values | Target Values Table Column Polynomial Terms | Row 1 | Row 2 |
| {1, 2} | | 1.000 | 3.000 |
| | $s = \log_e d$ | 0.000 | 1.363 |
| | $s = \log_2 d$ | 0.000 | 2.000 |
| | | 1.000 | [illegible] |
| | $s = d^{1.5}$ | 1.000 | 5.196 |
| | $s = d^2$ | 1.000 | 16.000 |

Found Term $f_{term} = \{d^2, d\}$

Zero Source Values Table Row, Shift Other Row Values to the Left

| Comparison Source Values Versus Target Values | | | |
|---|---|---|---|
| Source Values Table d-values | Target Values Table Column Polynomial Terms | Row 1 | Row 2 |
| {1, 2} | | 0.000 | 3.000 |
| | $s = d^2$ | 0.693 | 0.693 |
| | $s = \log_e d$ | 1.000 | 1.000 |
| | $s = \log_2 d$ | 2.000 | 2.000 |
| | $s = d$ | 2.828 | 2.828 |
| | $s = d^2$ | 4.000 | 4.000 |

Condition "C" Determined Save Constant Value

| Comparison Source Values Versus Target Values | | |
|---|---|---|
| Source Values Table d-values | Target Values Table Column Polynomial Terms | Row 1 |
| {1} | | 1.000 |
| | $s = \log_e d$ | 1.363 |
| | $s = \log_2 d$ | 2.000 |
| | $s = d$ | 4.000 |
| | $s = d^{1.5}$ | 5.196 |
| | $s = d^2$ | 16.000 |

$s_{calc} = 1.000$ $f_{term} = \{d^2, \mp d, 1.000\}$

FIG. 14F

SYSTEMS AND METHODS OF AUTOMATICALLY CONSTRUCTING DIRECTED ACYCLIC GRAPHS (DAGS)

CROSS-REFERENCE TO RELATED APPLICATIONS

The present application claims priority to and the benefit of U.S. Provisional Patent Application Ser. No. 63/418,456, filed Oct. 21, 2022, which is fully incorporated herein by reference.

TECHNICAL FIELD

The present invention relates generally to the transformation of cloud-based platform selection and management activities into directed acyclic graph (DAG)-based workflows comprised of a set of simple (loopless) time-affecting linear pathways (STALPs). No-code/low-code algorithms can be decomposed into sets of markup or scripting language time-affecting linear pathways (M-S TALPs) for enhancement on selected cloud-based platforms.

BACKGROUND OF THE INVENTION

There are many cloud-based platforms that cater to application developers and users. Rather than developers and users manually controlling a platform, which includes managing the available platform hardware, software, security systems, and access restrictions, it is possible to automatically manage the platform using workflows.

Using cloud-based platforms to generate and deploy software applications can require a great deal of skill and training. For example, learning the fundamentals of Microsoft's Azure platform requires a day-long course and another four days for the administrator associate course, five days for the developer associate course, and five days for the security engineer associate course as well as fifty-seven days of required training to be a useful, productive Azure platform user. It is not just Microsoft that requires such extensive training to gain adequate proficiency but also SAP, Amazon Web Services, VMware, RightScale, Rackspace, IBM, BMC, Salesforce, and Seclair. Unfortunately, these platforms are not typically cross-compatible, meaning learning each one separately is required.

Writing software has been considered difficult, requiring a high level of training. As software takes on a more central role in the world economy, the need for more software to solve business problems has outstripped the number of trained professionals. This has led to use of no-code/low-code development platforms. These platforms allow a user to drag and drop software processes onto a display screen, link together those processes with sources of data, link together multiple processes with the output of one being the input of another and use scripting languages to create different processing pathways.

A no-code/low-code system offers great advantages over a traditional system in that non-programmers can create their own application programs without the time and training traditional application programming requires. However, although convenient, adequate testing, processing efficiency, ownership identification, and operational optimization are all of concern with no-code/low-code software solutions.

SUMMARY OF THE INVENTION

The technology, methods, and systems of the present invention disclosed herein can utilize systems and methods, such as U.S. Pub. No. 2020/0210162, which is fully incorporated herein by reference, to first decompose directed acyclic graph (DAG) workflows into a set of simple (loopless) time-affecting linear pathways (STALPs) and then to decompose any existing no-code/low-code processes into analyzable components called markup or scripting language time-affecting linear pathways (M-S TALPs).

Complex endeavors such as control of cloud-based platforms can be managed using DAG workflows. A DAG workflow is, by definition, a workflow that does not contain loops (cycles). Removing loops from workflows greatly decreases the complexity of the work performed. This can be understood by calculating the cyclomatic complexity of a loopless pathway, as shown in McCabe's discussion on complexity measurement. McCabe showed that all pathways without loops have the minimum possible complexity of one; therefore, all DAG pathways also have the minimum complexity of one. The minimum complexity means the minimum number of human-generated errors, according to McCabe's work.

The present invention shows the creation of an easy-to-use DAG-structured workflow, which is automatically decomposed into STALPs, to manage cloud-based platforms. With its minimum cyclomatic complexity, a DAG workflow is equivalent to a set of STALPs. Unlike standard TALPs for which time varies as a function of the input variable attribute values, as disclosed in U.S. Pat. No. 10,496,514, which is fully incorporated herein by reference.

Thus, the benefits of using STALPs include minimum human errors while in use (minimum complexity), fixed processing time, and decreased operational complexity, as well as dynamically calculable resource allocation (advanced space complexity) used for optimization. STALPs are used to control the hardware and software of cloud-based no-code/low-code application execution.

No-code/low-code algorithms are decomposed into sets of M-S TALPs for enhancement on the selected cloud-based platforms. The M-S TALPs are used to allow for the automatic no-code/low-code analytics required to test, compare memory uses, compare processing timings, determine duplicate solutions, optimize memory use, and reuse traditionally generated coding solutions in low-code environments.

The analytics performed on M-S TALPs can include techniques similar to those used in the U.S. Pat. No. 10,496,514, which teaches advanced time complexity and advanced speedup techniques for standard TALPs. In addition to using advanced time complexity and advanced speedup for no-code/low-code processes, the present invention can utilize the extended concept of space complexity disclosed in the U.S. patent application Ser. No. 18/367,996, filed Sep. 13, 2023 and titled Methods and Systems for Time-Affecting Linear Pathway (TALP) extensions, which is fully incorporated herein by reference, to analyze RAM, output, and cache utilization, given some input dataset.

Space complexity, the memory allocation or space requirements of an algorithm given an input dataset size, can be contrasted with time complexity, which is the amount of time it takes an algorithm to process a given input dataset size. An advanced version of time complexity (for standard TALPs) allows one or more input variable attributes to be used, not just dataset size, in the creation of time complexity, which is shown herein to also be true for M-S TALPs. Analogously, the relationship of input variable attributes to the amount of memory allocated can be determined as an advanced version of space complexity. Space complexity techniques and uses are herein extended to both M-S TALPs.

After decomposing a no-code/low-code application into a set of M-S TALPs, advanced time complexity, speedup, space complexity, and freeup predictive analytics, are constructed for each M-S TALP. These analytics are then used to determine the M-S TALP's overall memory use and processing performance. Methods of the present invention are used to optimize memory use and processing performance by automatically generating a dynamic parallel solution for each dataset of each M-S TALP in the application's set of M-S TALPs. The parallel solution ensures that the minimum processing time and memory allocation are used per processing element, thus optimizing the performance and efficiency of the M-S TALP. The invention also correctly determines if a given M-S TALP has already been generated and saved in a library of M-S TALPs through M-S TALP identification.

In various embodiments of the present invention, a method of decomposing interpreted no-code/low-code algorithms for enhancement on a selected computing platform comprises decomposing one or more no-code/low-code algorithms into one or more interpreted M-S TALPs to calculate no-code/low-code real-time software analytics, calculating advanced time complexity for each of the one or more M-S TALPs, calculating space complexity for each of the one or more M-S TALPs, calculating predictive freeup analytics for each of the one or more M-S TALPs, and processing at least the calculated advanced time complexity, the calculated space complexity, and the calculated predictive freeup analytics to determine overall memory usage and compute processing performance of the one or more M-S TALPs to minimize memory allocation and processing time.

BRIEF DESCRIPTION OF THE DRAWINGS

FIG. 14 shows an example of polynomial generation from selected column headers of a polynomial generation table and selection of the best polynomial from maximum error analysis, in accordance with embodiments of the present invention.

FIGS. 14A-14F show exemplary tables used in the polynomial generation process, in accordance with embodiments of the present invention.

DETAILED DESCRIPTION OF THE PREFERRED EMBODIMENTS

Figure 1:
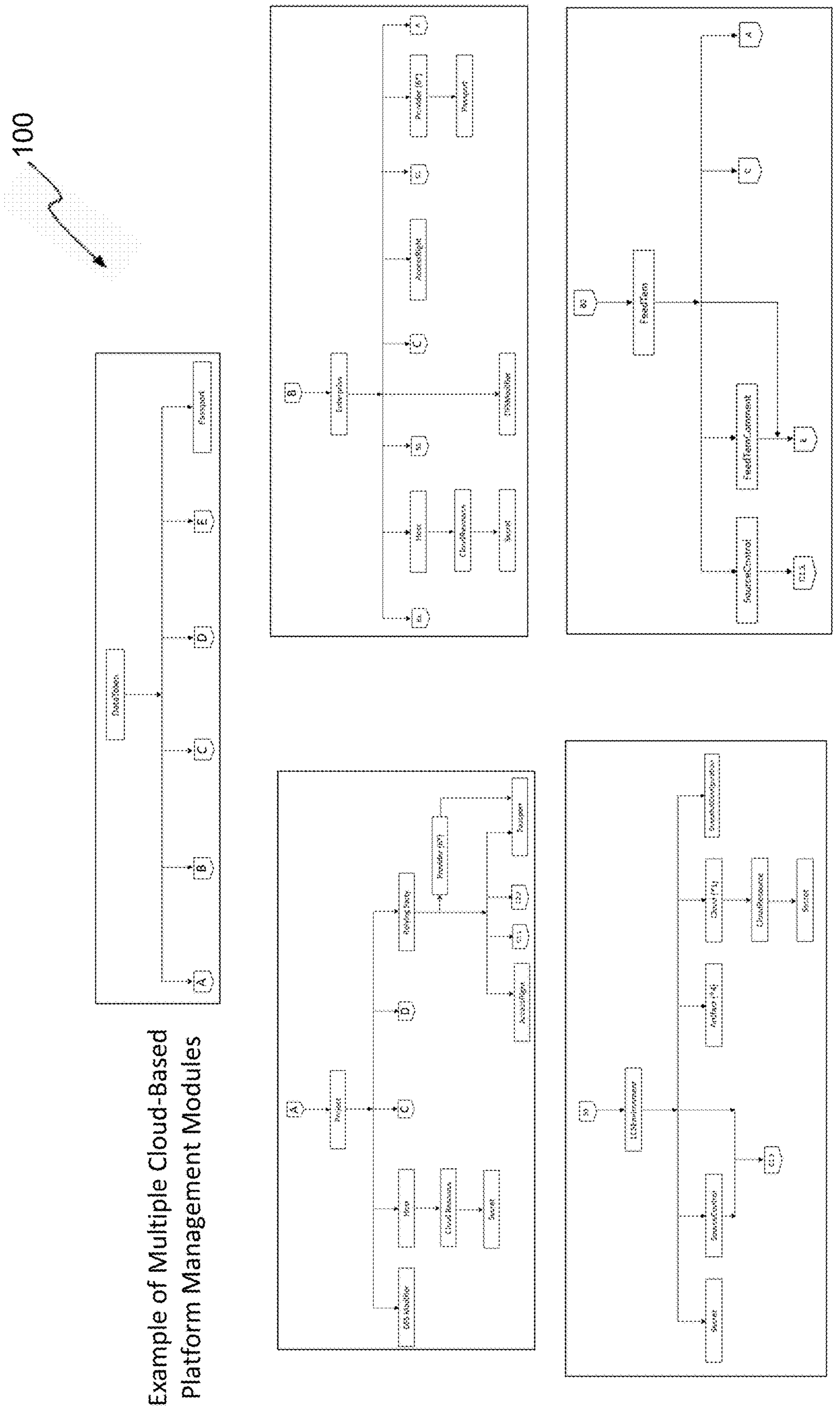
FIG. 1 shows example modules structured as a DAG and used to manage multiple cloud-based no-code/low-code platforms, in accordance with embodiments of the present invention.

Cloud-computing platform use can be complex, and this is especially true when used to perform access control, project management, application development, and application deployment. The classic method of ensuring that all needed tasks are accomplished is the use of automated workflows. If the automated workflow is structured as a directed acyclic graph (DAG), then the cloud-computing platform workflow complexity can be automatically minimized.

In order to rapidly generate applications on cloud computing platforms, no-code/low-code techniques are frequently used. An application that uses no-code/low-code techniques for its development means the use of a code development platform that allows the developer to drag, drop, and link together software components rather than the use of text-based software languages. No-code/low-code solutions are typically generated either by using a no-code/low-code platform or the portion of a platform dedicated to no-code/low-code development.

DAG workflows are decomposed into a set of simple (loopless) time-affecting linear pathways (STALPs). Then, any existing no-code/low-code processes are decomposed into analyzable components called markup or scripting language time-affecting linear pathways (M-S TALPs).

The benefits of using STALPs include minimum human errors while in use (minimum complexity), fixed processing time, and decreased operational complexity, as well as dynamically calculable resource allocation (advanced space complexity) used for optimization. STALPs are used to control the hardware and software of cloud-based no-code/low-code application execution.

No-code/low-code algorithms are decomposed into sets of M-S TALPs for enhancement on the selected cloud-based platforms. The M-S TALPs are used to allow for the automatic no-code/low-code analytics required to test, compare memory uses, compare processing timings, determine duplicate solutions, optimize memory use, and reuse traditionally generated coding solutions in low-code environments.

After decomposing a no-code/low-code application into a set of M-S TALPs, advanced time complexity, speedup, space complexity, and freeup predictive analytics, are constructed for each M-S TALP. These analytics are then used to determine the M-S TALP's overall memory use and processing performance. Methods of the present invention are used to optimize memory use and processing performance by automatically generating a dynamic parallel solution for each dataset of each M-S TALP in the application's set of M-S TALPs. The parallel solution ensures that the minimum processing time and memory allocation are used per processing element, thus optimizing the performance and efficiency of the M-S TALP. The present invention also correctly determines if a given M-S TALP has already been generated and saved in a library of M-S TALPs through M-S TALP identification.

Various devices or computing systems can be included and adapted to process and carry out the aspects, computations, and algorithmic processing of the software systems and methods of the present invention. Computing systems and devices of the present invention may include a processor, which may include one or more microprocessors, and/or processing cores, and/or circuits, such as an application specific integrated circuit (ASIC), field-programmable gate arrays (FPGAs), etc. Further, the devices can include a network interface. The network interface is configured to enable communication with a communication network, other devices and systems, and servers, using a wired and/or wireless connection.

The devices or computing systems may include memory, such as non-transitive, which may include one or more non-volatile storage devices and/or one or more volatile storage devices (e.g., random access memory (RAM). In instances where the computing devices include a microprocessor, computer readable program code may be store3d in a computer readable medium or memory, such as, but not limited to drive media (e.g., a hard disk or SSD), optical media (e.g., a OVO), memory devices (e.g., random access memory, flash memory), etc. The computer program or software code can be stored on a tangible, or non-transitive, machine-readable medium or memory. In some embodiments, computer readable program code is configured such that when executed by a processor, the code causes the device to perform the steps described above and herein. In other embodiments, the device is configured to perform steps described herein without the need for code.

It will be recognized by one skilled in the art that these operations, algorithms, logic, method steps, routines, subroutines, and modules may be implemented in software, in firmware, in special purpose digital logic, and any combination thereof without deviating from the spirit and scope of the present invention as recited within the claims attached hereto.

The devices or computing devices may include an input device. The input devices is configured to receive an input from either a user (e.g., admin, user, etc.) or a hardware or software component—as disclosed herein in connection with the various user interface or automatic data inputs. Examples of an input device include a keyboard, mouse, microphone, touch screen and software enabling interaction with a touch screen, etc. The devices can also include an output device. Examples of output devices include monitors, televisions, mobile device screens, tablet screens, speakers, remote screens, etc. The output devices can be configured to display images, media files, text, video, or play audio to a user through speaker output.

Server processing systems for use or connected with the systems of the present invention, can include one or more microprocessors, and/or one or more circuits, such as an application specific in ASIC, FPGAs, etc. A network interface can be configured to enable communication with a communication network, using a wired and/or wireless connection, including communication with devices or computing devices disclosed herein. Memory can include one or more non-volatile storage devices and/or one or more volatile storage devices (e.g., RAM). In instances where the server system includes a microprocessor, computer readable program code may be stored in a computer readable medium, such as, but not limited to drive media (e.g., a hard disk or SSD), optical media (e.g., a DVD), memory devices etc.

Figure 2:
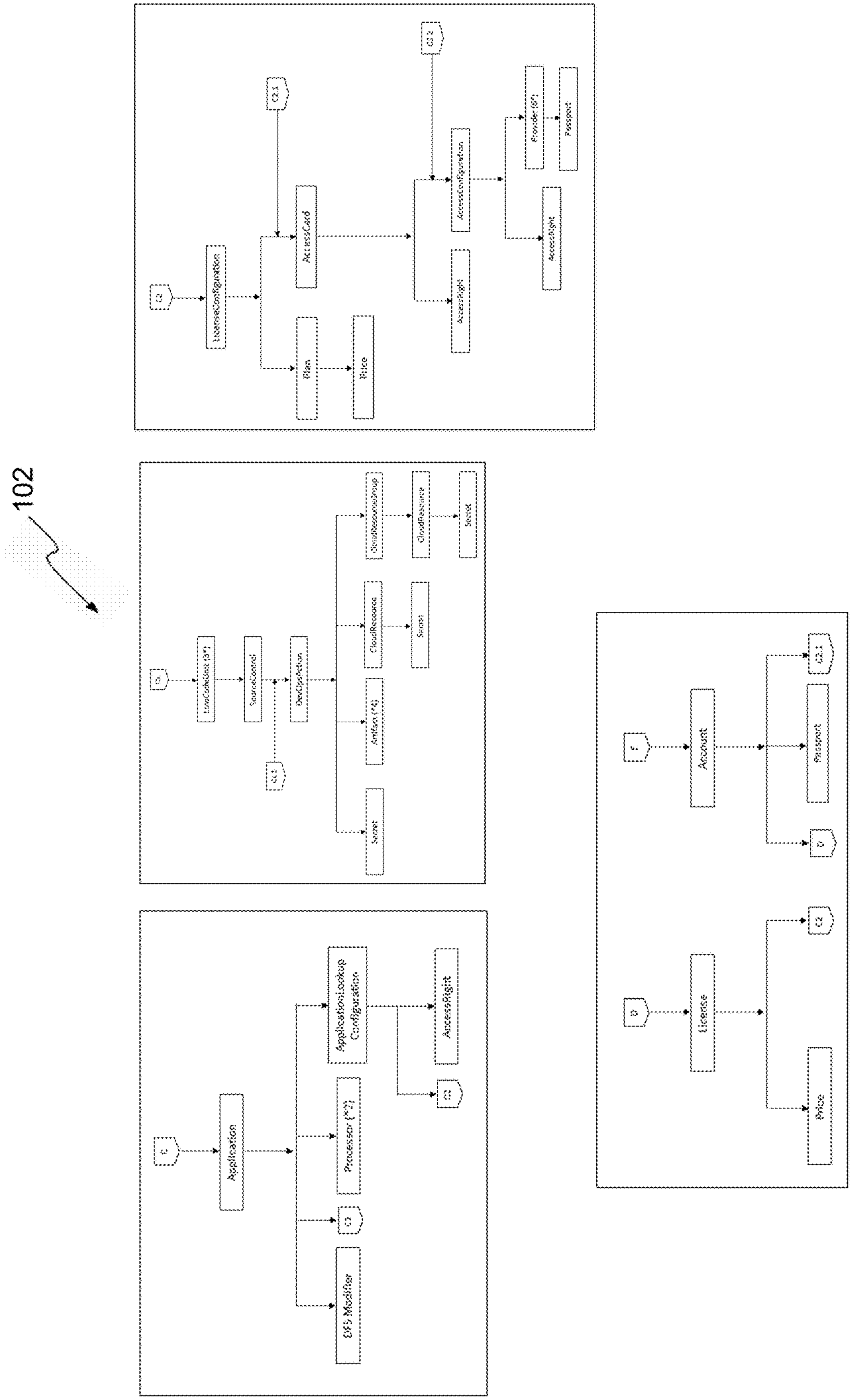
FIG. 2 shows another example of modules structured as a DAG and used to manage multiple cloud-based no-code/low-code platforms, in accordance with embodiments of the present invention.

FIGS. 1 and 2 together show an example of a set of hierarchically structured modules 100, 102 that can be chained together as a workflow, given that their hierarchy remains nonvolatile, and are used to control cloud-based no-code/low-code development, deployment, updates, hardware access, project access control, version control, application access control, application change control, among other things. There are no looping pathways, and there is a single starting point (e.g., Data Token, Project, Enterprise, LCSEnvironment, FeedTem, Application, LowCodeUnit, LicenseConfiguration, License, Account, etc.) that connects multiple pathways. The structure shown in FIG. 1 and FIG. 2 shows a multipath DAG structure.

Figure 3:
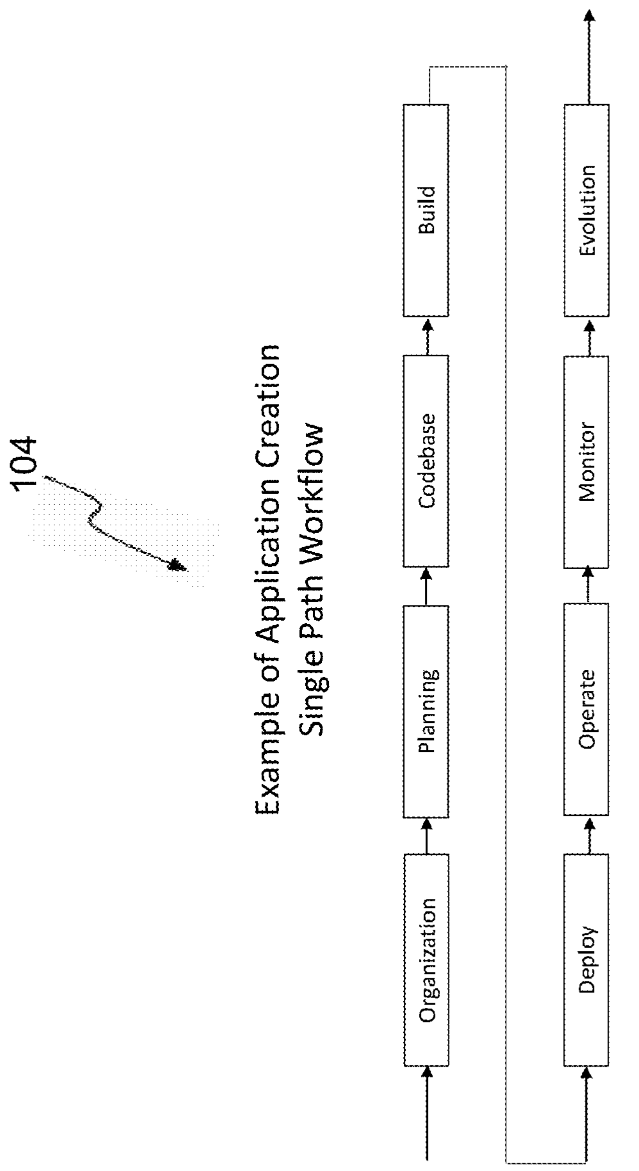
FIG. 3 shows an example of a single-pathway application creation workflow, in accordance with embodiments of the present invention.

FIG. 3 shows an example of a single-path workflow 104 used to develop, manage, and distribute a project consisting of one or more no-code/low-code processes. This single pathway has a single starting and single ending point and contains no looping structures. Thus, this single-path workflow represents a simple DAG structure.

Figure 4:
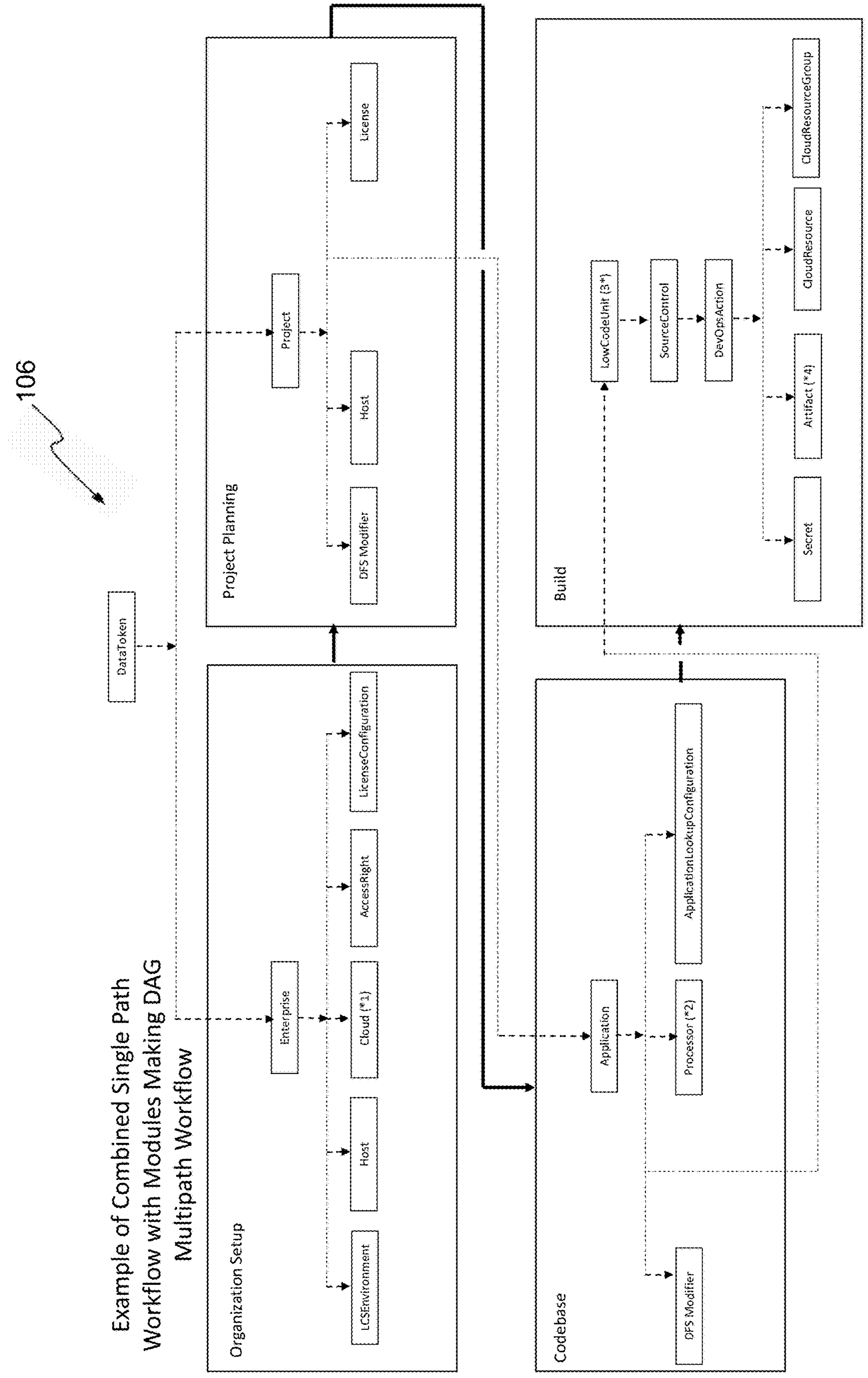
FIG. 4 shows an example of the single-pathway application creation workflow with the required hierarchical work modules, converting the single pathway into a multiple-pathway DAG structured workflow, in accordance with embodiments of the present invention.

FIG. 4 is a diagram 106 showing the effect of combining a set of hierarchically defined cloud-based platform control modules 100, 102 of FIG. 1 and FIG. 2 with the single path code development workflow shown in FIG. 3. Together they extend the workflow of FIG. 3 by adding the multiple possible pathways of FIG. 1 and FIG. 2, generating a multiple pathway workflow. Since neither the multiple module pathways nor the single-path code development workflow has loops, the new combined structure, a multipath workflow, also has no loops. Since the flow moves in one direction and there are no loops, this entire structure represents a DAG, a DAG workflow.

Figure 5:
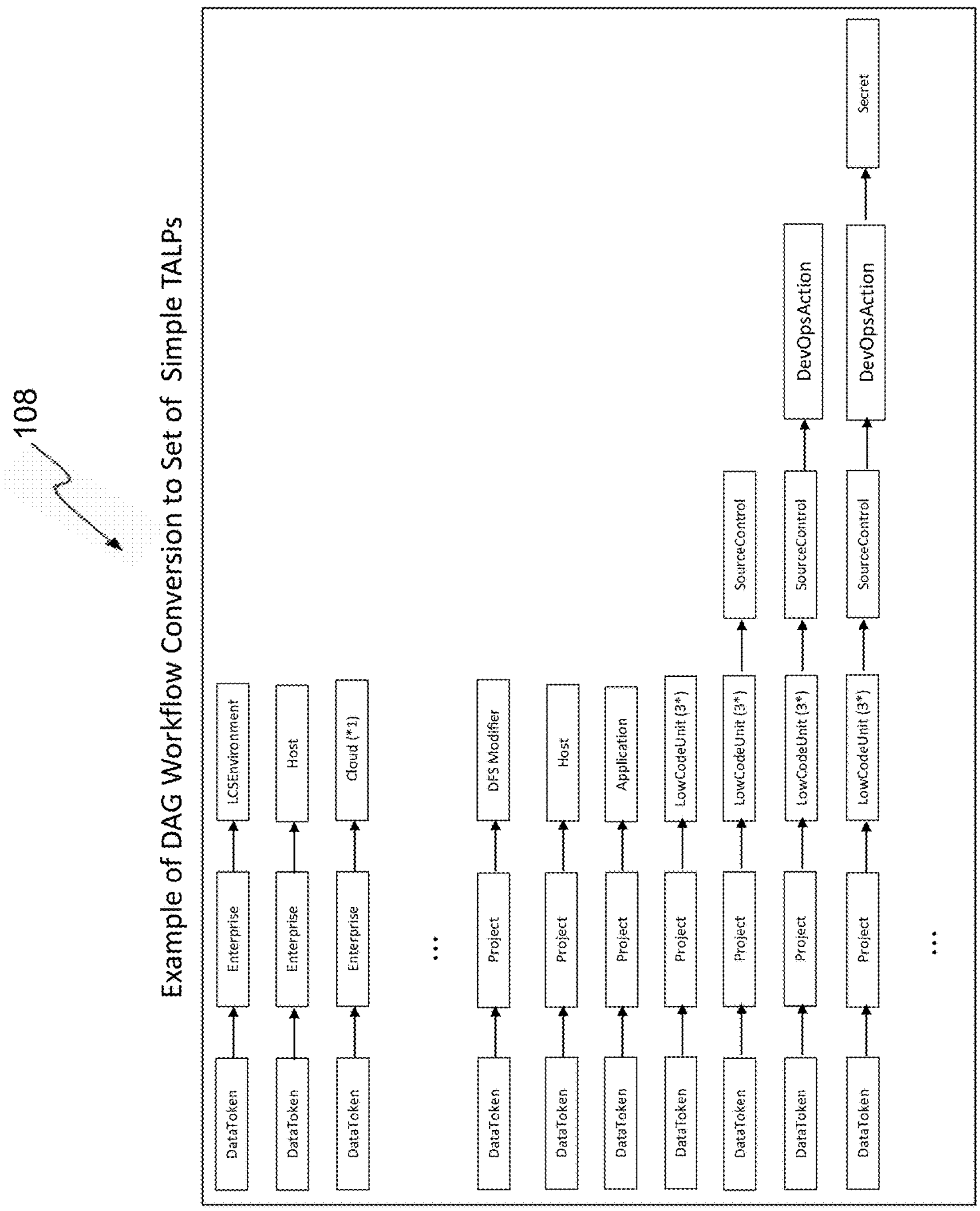
FIG. 5 shows an example of a multiple-pathway, hierarchical directed acyclic graph workflow decomposed into a set of simple (loopless) TALPs (STALPs), in accordance with embodiments of the present invention.

FIG. 5 shows a diagram 108 of a set of time-affecting linear pathways (TALPs), derived from the decomposition of the combined multiple-path DAG workflow shown in FIG. 4. Since there are no loops in any of the derived TALPs, they are considered a set of simple TALPs, or STALPs. Therefore, DAG workflows always decompose into a set of STALPs. Since there are no loops, the processing time equals the sum of the module processing times plus any module-to-module data communication time.

Figure 6:
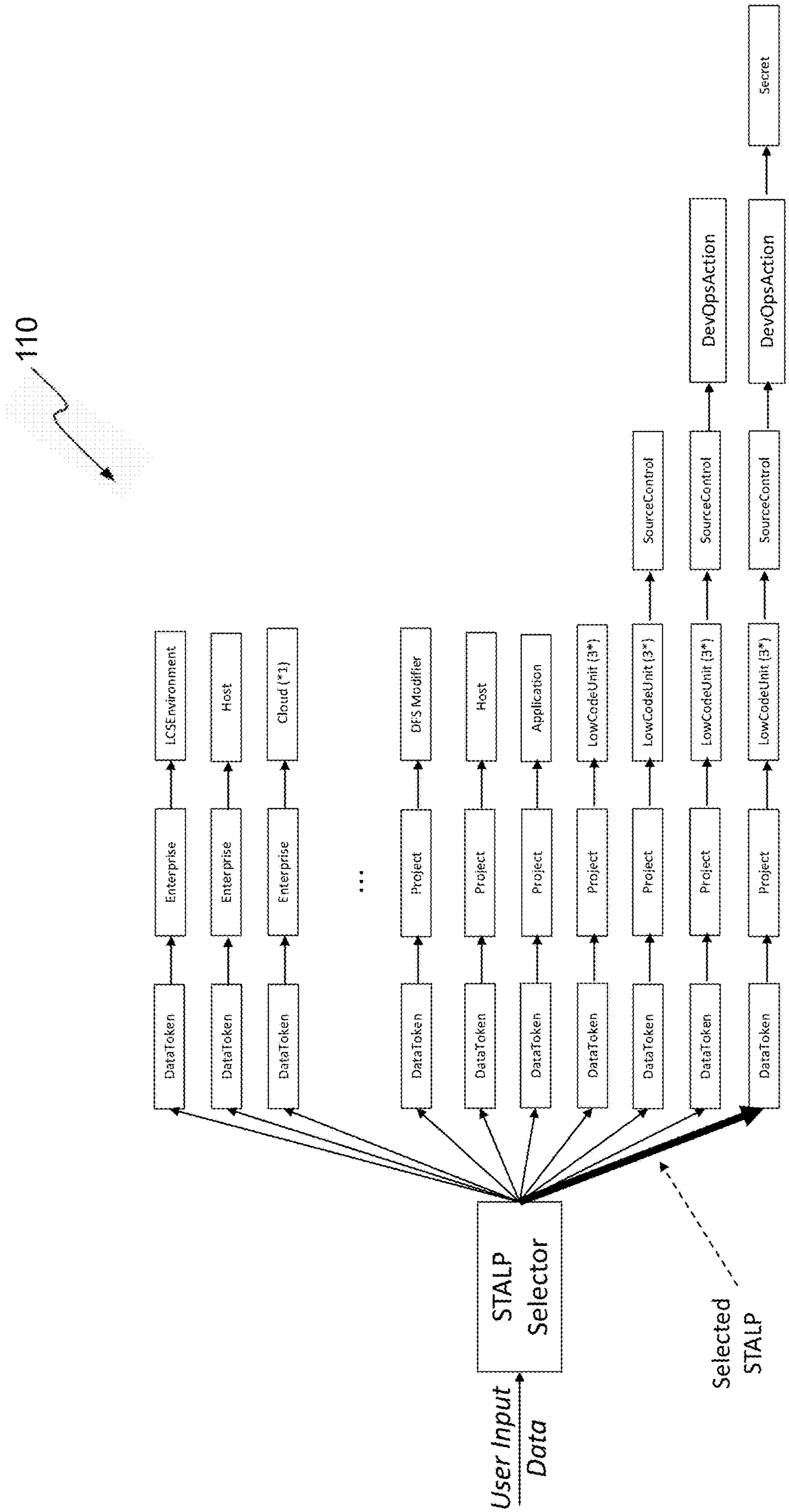
FIG. 6 shows the selection of a particular STALP from a set of DAG workflow STALPs, removing control conditions from the hierarchical workflow, in accordance with embodiments of the present invention.

DAG Fixed Processing Time per Pathway — Equation 1

$$STALP_x = DTT_x + \sum_{y=1}^{n} T_x(\text{module}_y)$$

Where $T_x(\text{module}_y) =$ processing time of the $y^{th}$ module of the $x^{th}$ $STALP$ $DTT_x =$ data transport time for the $x^{th}$ $STALP$ FIG. 6 shows a diagram 110 of the selection of STALPs given a set of user input data. There are no control or conditional statements in any of the STALPs. There is no need for conditional statements as the user input data is sufficient to select the correct STALP. This is analogous to the automatic TALP determination, whereby the input variable attribute values are used to identify which TALP is to be used. Eliminating control conditions increases the performance of the workflow. In addition, automatic TALP determination from input values means that human interaction with the workflow is unnecessary. This means that the system detecting a valid input dataset is enough to perform the workflow, whether the input dataset originated from other systems, inputs, or humans.

Figure 7:
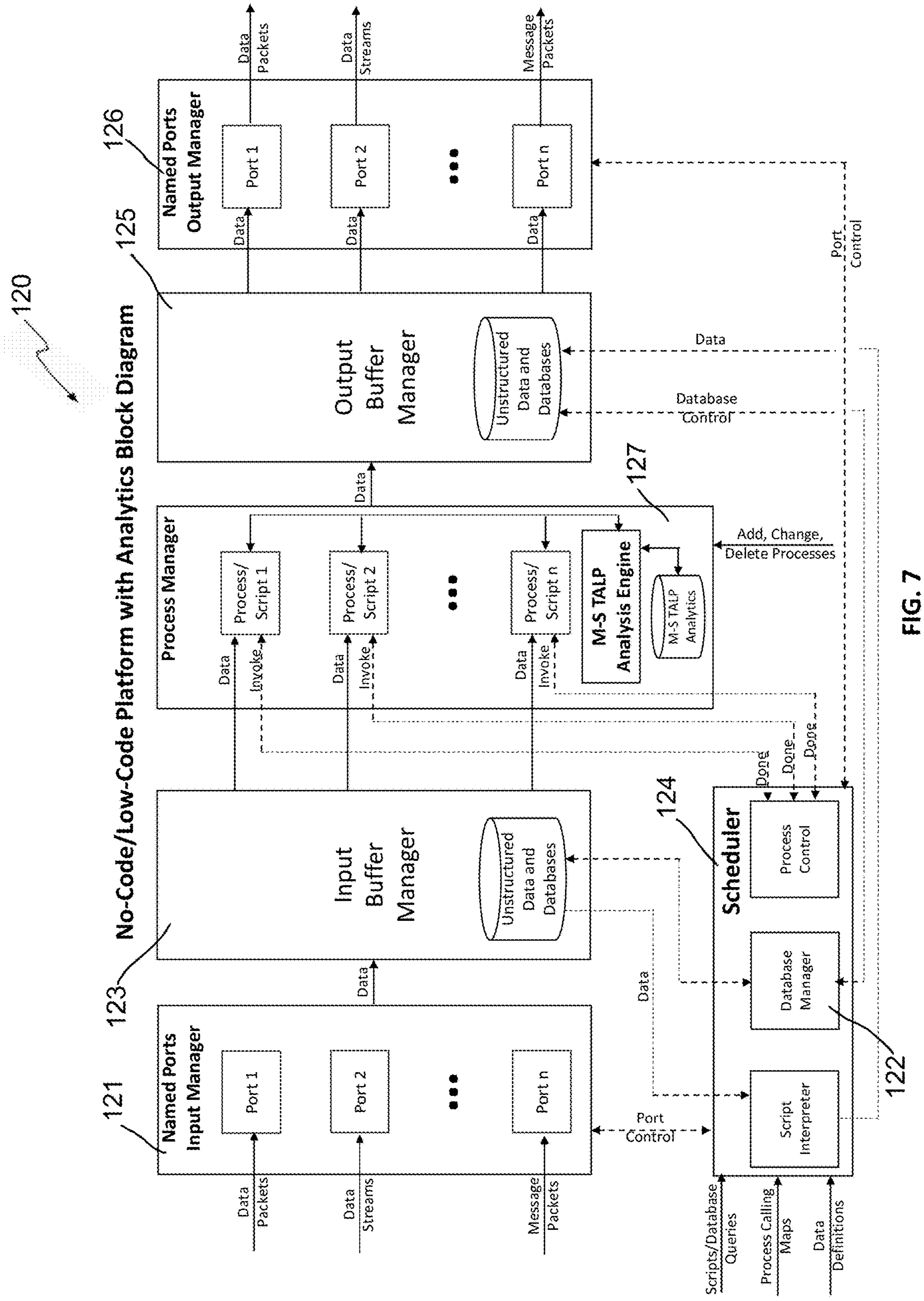
FIG. 7 shows a notational diagram of a simplified no-code/low-code development platform, including a provision for M-S TALP analytics and storage, which represents a departure from standard no-code/low-code development platforms, in accordance with embodiments of the present invention.

FIG. 7 shows an example of a no-code/low-code platform block diagram 120. In order to perform work, the platform must receive an application consisting of either maps of processes with process connections, a script, or a combination of the two. The process-calling map is constructed by linking together processes that are written using markup languages (e.g., XML, JSON, YAML, HTML, XHTML, etc.) and are drag-and-dropped onto a graphical work area in a browser or other interface. The map can also consist of scripts (e.g., javaScript, Python, Perl, Visual Basic, Rexx, Bash, etc.), database language queries (e.g., DDL, DCL, TCL, SQL, XQuery, OQL, etc.), or combinations of script/database queries and drag-and-drop no-code processes.

Execution of a software application causes the associated named input data ports 121 to wait to receive data from one or more sources including other named ports, buffers, databases, display screens, data storage devices, LAN, WAN, Internet, IOT, and IO streams, to name a few. The database manager 122 formats and stores any received data and places the data into the proper database locations that are part of the input buffer 123. When a sufficient amount of the correct type of input data is received, the scheduler 124 causes any required process to activate, either separately (as in the case of no-code applications) or as a module call (as in the case of a script low-code application). The activated process generates data which is placed into the output buffer 125. The output data is formatted and saved into the associated output database locations. When a sufficient amount of output data has been generated, a named output port 126 is activated and the output data transmitted. If some or all of the output data is sent to a named input port, then another process can be activated once sufficient data is received.

The software application is considered low-code if there are scripts used within the calling sequence of the application. If the application consists of only drag-and-drop precreated processes, then it is considered a no-code application. It should be noted that the processes are asynchronous and are activated from the scheduler-generated criteria.

This standard no-code/low-code application execution model is altered using the techniques of the present invention to decompose the application into its M-S TALPs then use the input dataset values to select the correct M-S TALP for execution. These techniques are embedded in the no-code/low-code platform as the M-S TALP Analysis Engine 127.

Figure 8:
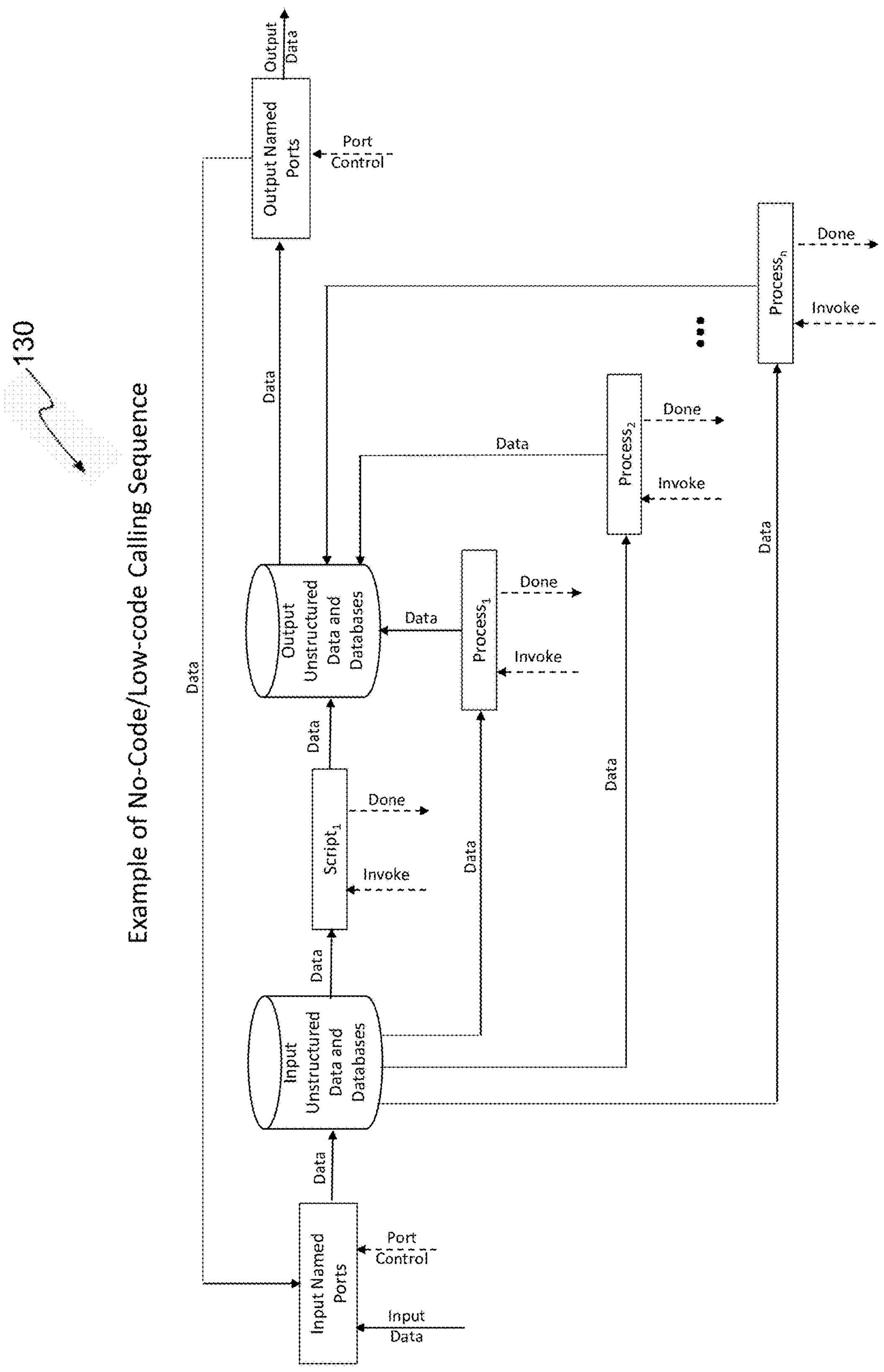
FIG. 8 shows an example of a sequence of scripts and processes and their interaction with a no-code/low-code platform, in accordance with embodiments of the present invention.

FIG. 8 shows an example diagram 130 of a low-code application-calling sequence. Here, a single script is called, followed by multiple drag-and-drop processes. If there are no scripts and/or database queries, it would be considered a no-code application-calling sequence.

The drag-and-drop processes used in no-code/low-code applications can be thought of or treated as algorithms in and of themselves. This means that the drag-and-drop processes of no-code/low-code applications can be decomposed into TALPs and analyzed using various techniques. Since TALPs are defined for source-code/execution-code algorithms, that is, algorithms that are made to execute in an operating system, and since the processes of no-code/low-code applications are defined for markup languages, tagged documents and/or scripting language code that executes inside of a web browser, a new type of TALP, the markup-scripting time-affecting linear pathway (M-S TALP), is used herein for no-code/low-code applications.

A no-code/low code platform can have or be employed with multiple embodiments: stand-alone, centralized client-server, decentralized cloud-based, decentralized ad hoc, and decentralized peer-to-peer ad hoc. Each embodiment has different strengths and weaknesses with the intention of efficiently serving different markets.

Figure 9:
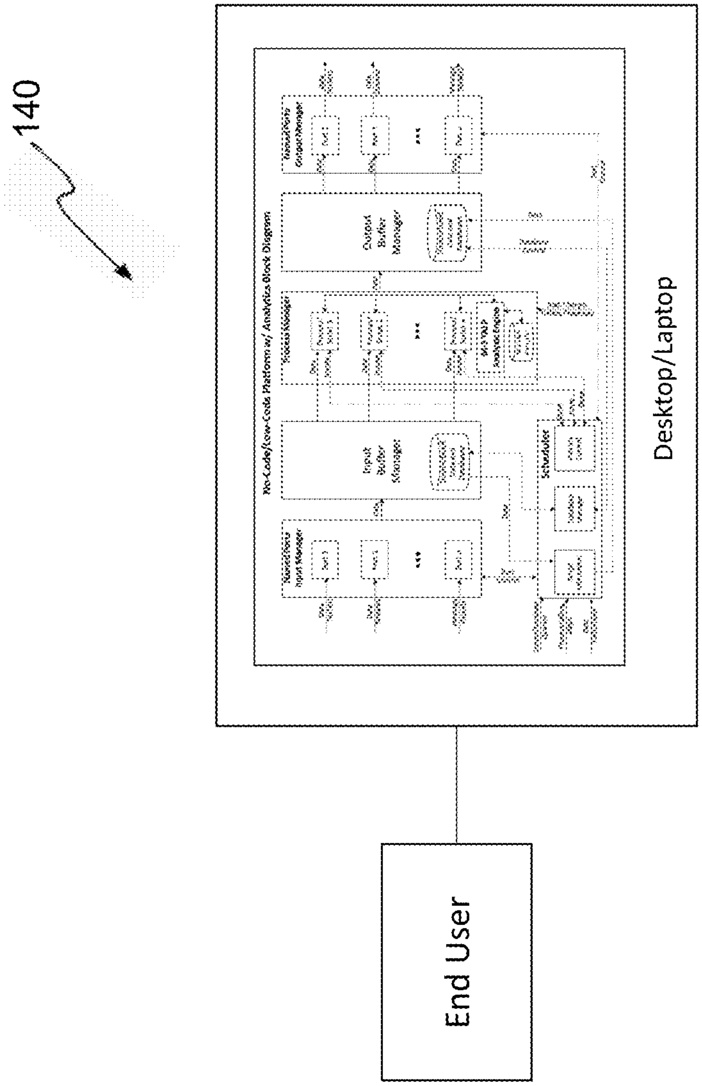
FIG. 9 shows a no-code/low-code platform with M-S TALPs embodied on a stand-alone desktop or laptop computer system, in accordance with embodiments of the present invention.

FIG. 9 shows the present invention embedded in a no-code/low-code platform that is embodied in a stand-alone system 140. The stand-alone embodiment allows a non-programmer with access to a desktop or laptop computer to generate no-code/low-code applications. Only a single user can connect to the stand-alone platform and utilize its services. The single-user restriction means problems associated with data security and IP theft that are common with no-code/low-code platforms are automatically reduced. However, the single-user restriction also means that this embodiment is poorly suited for organizations of greater than one person. Even though the stand-alone system exists only on a single system, it is still implemented using web-browser technology. This allows for operating system independence and offers an upgrade path should the user wish to attach to either a LAN or the internet in the future.

Figure 10:
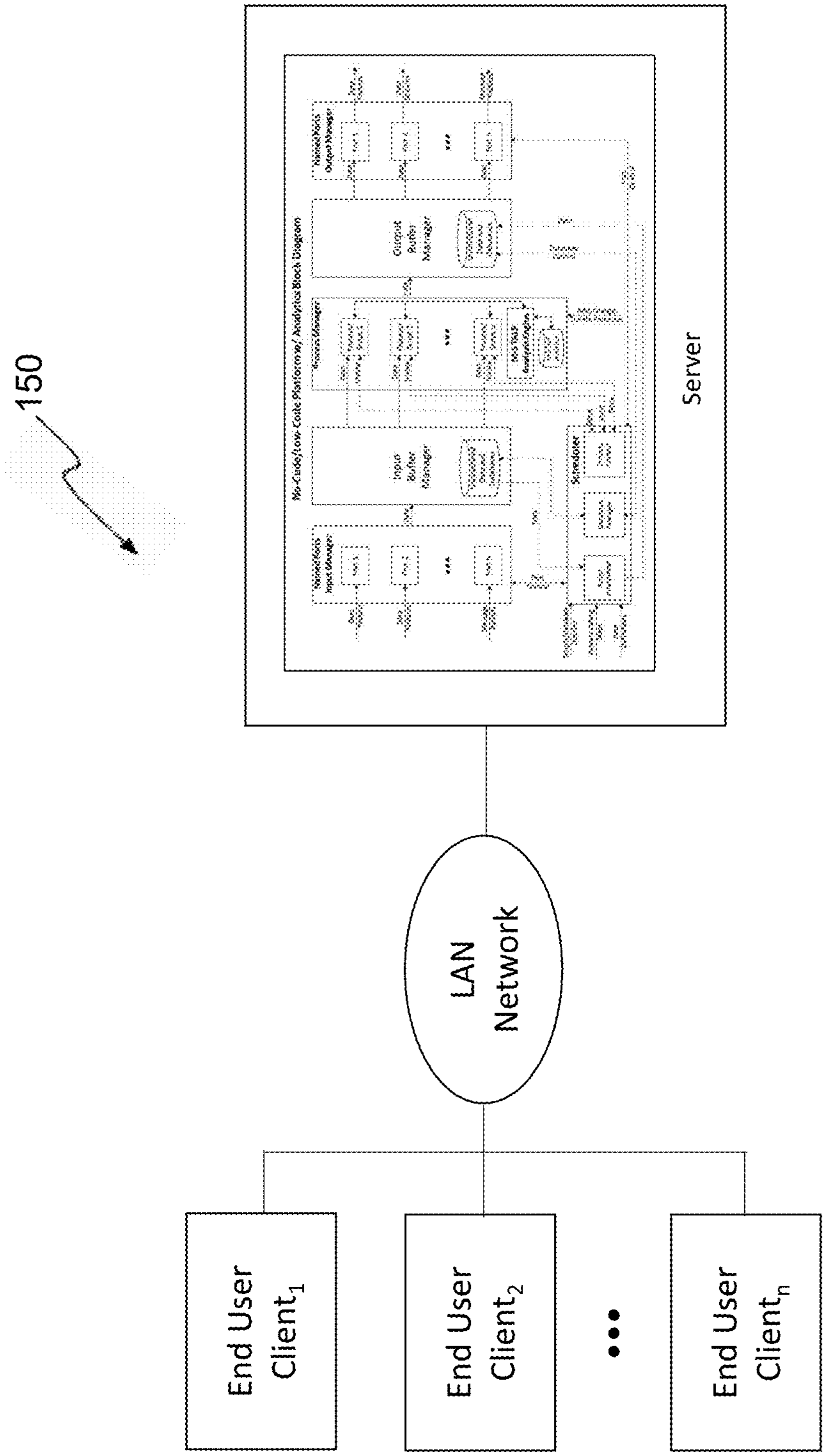
FIG. 10 shows a no-code/low-code platform with M-S TALPs embodied on a local area network using a client-server system, in accordance with embodiments of the present invention.

FIG. 10 shows the present invention embedded in a no-code/low-code platform that is embodied in a local area networked client-server system 150. This embodiment is useful for users that are connected via a local area network (LAN) using a centralized client-server model. Since a server can have more resources than a stand-alone system, multiple users can simultaneously use the platform. Because of its restriction to a particular LAN, it is designed for use in a single building or a single campus of buildings. Since this embodiment is geographically as well as user restricted, many of the problems like data security and IP theft associated with no-code/low-code platform usage is automatically reduced though multiple users increase the risk to the system. This embodiment is well suited for small and medium-sized organizations. Additional safety measures are required that go beyond those required for the stand-alone system. Like the stand-alone embodiment, the centralized client-server embodiment is implemented using web-browser technology for its front end.

Figure 11:
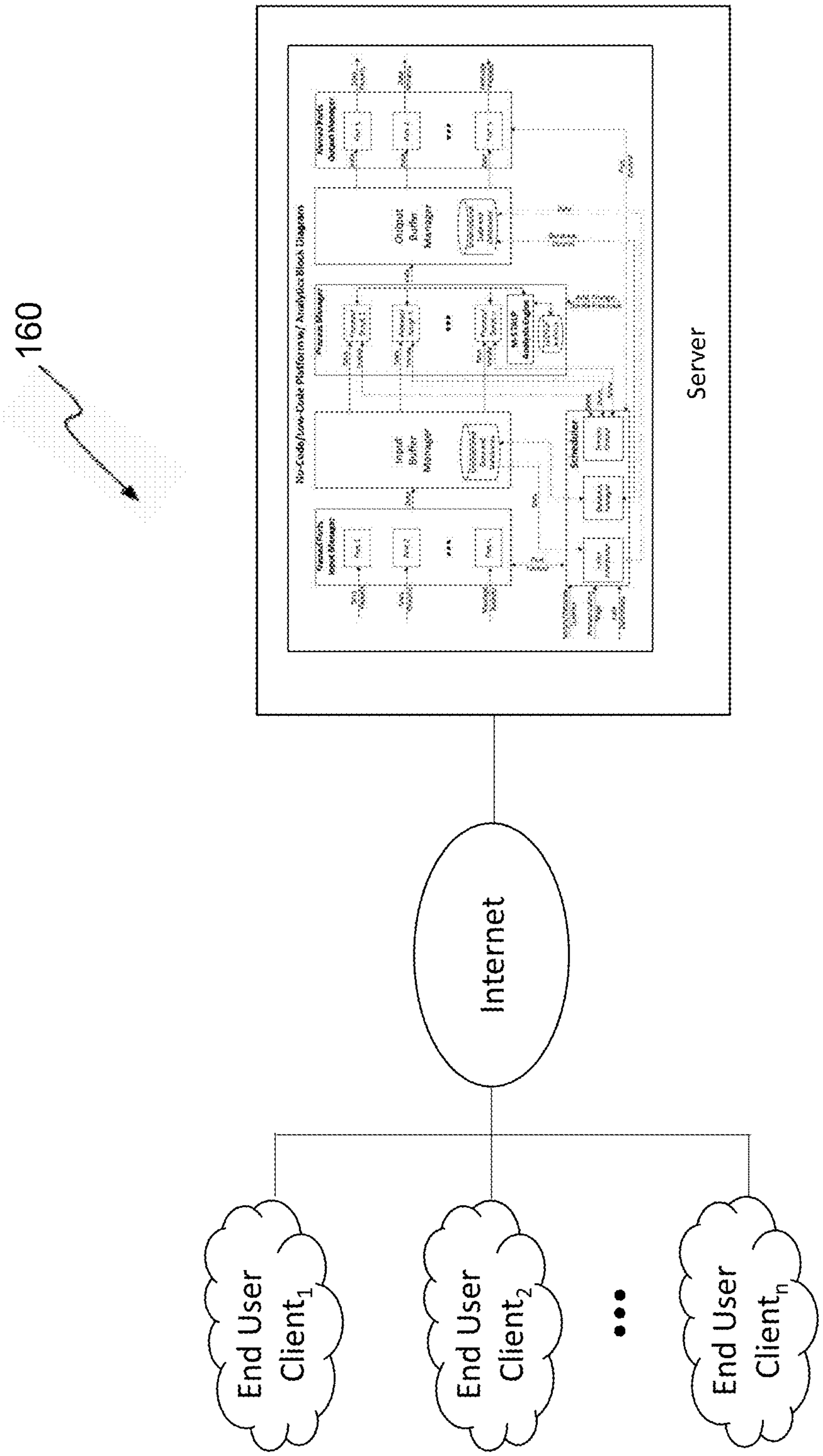
FIG. 11 shows a no-code/low-code platform with M-S TALPs embodied on a decentralized client-server system, in accordance with embodiments of the present invention.

FIG. 11 shows the present invention embedded in a no-code/low-code platform that is embodied in a decentralized cloud-based client-server system 160. This embodiment utilizes the internet instead of a local area network to connect users to the platform, removing geographic restraints. Since the client can be anywhere, connected to the internet, this embodiment can scale to enterprise levels, that is, large organizations that are geographically distributed. This embodiment is also implemented using web-browser technology for its front end.

Figure 12:
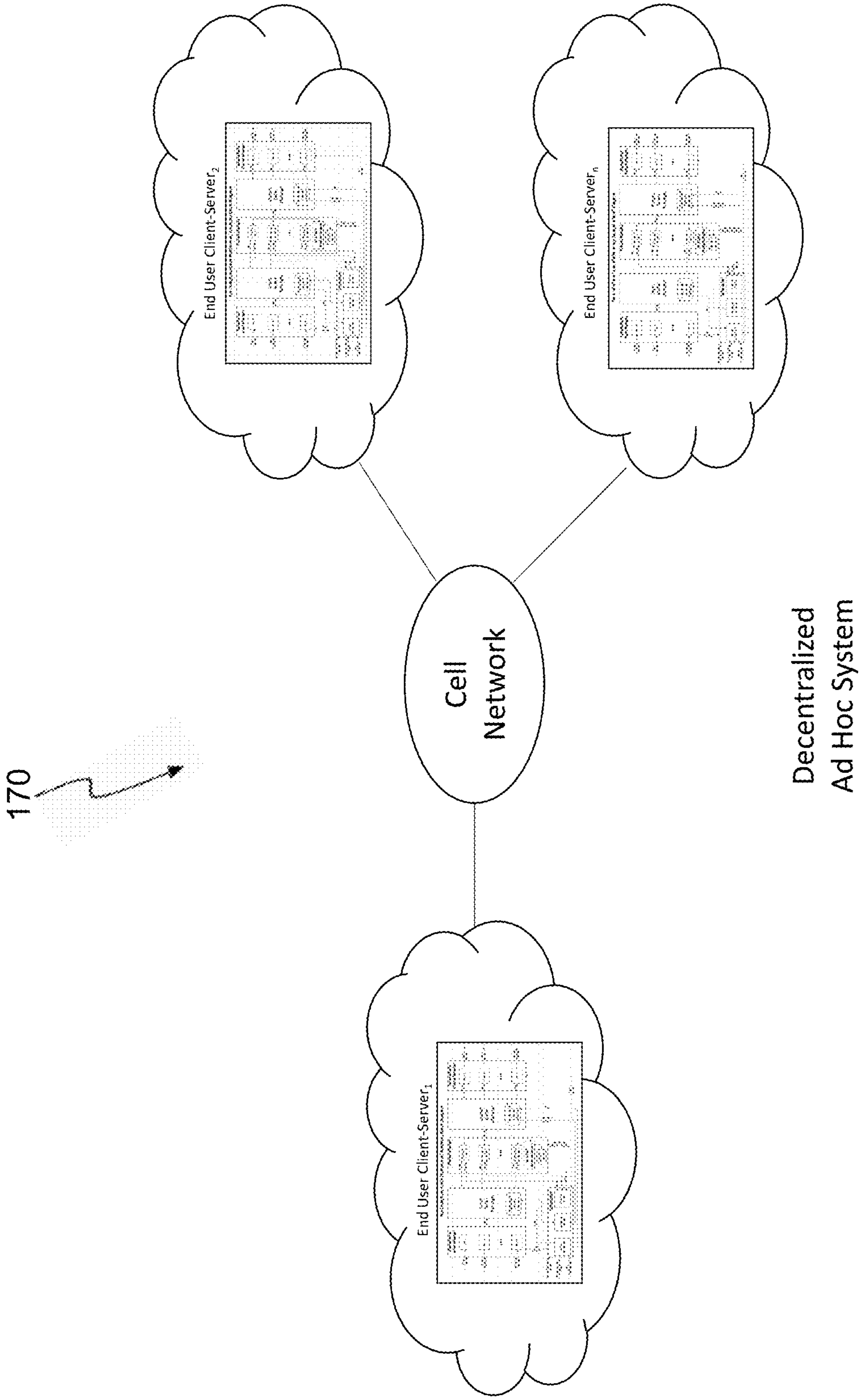
FIG. 12 shows a no-code/low-code platform with M-S TALPs embodied on a decentralized cell network ad hoc system, in accordance with embodiments of the present invention.

FIG. 12 shows the present invention embedded in a no-code/low-code platform that is embodied in a decentralized cell network-based ad hoc system 170. This embodiment allows a group of users to share mobile resources, including computational, memory, and algorithmic, within a cell phone network and has a higher security risk since unvetted users share logical and physical resources. Device dropouts are a problem as devices can be turned on or off at the whim of the various users, forcing the need for redundancy, especially for those applications that execute in parallel. Typically, the physical equipment is heterogeneous and therefore balancing processing time across multiple heterogeneous devices becomes very important especially if a script processes in parallel. Determining the originator, and thus owner, of a no-code/low-code application is also important. Although this embodiment is useful for groups, it is ill-suited when security is a primary concern, eliminating its use for most for-profit commercial entities.

Figure 13:
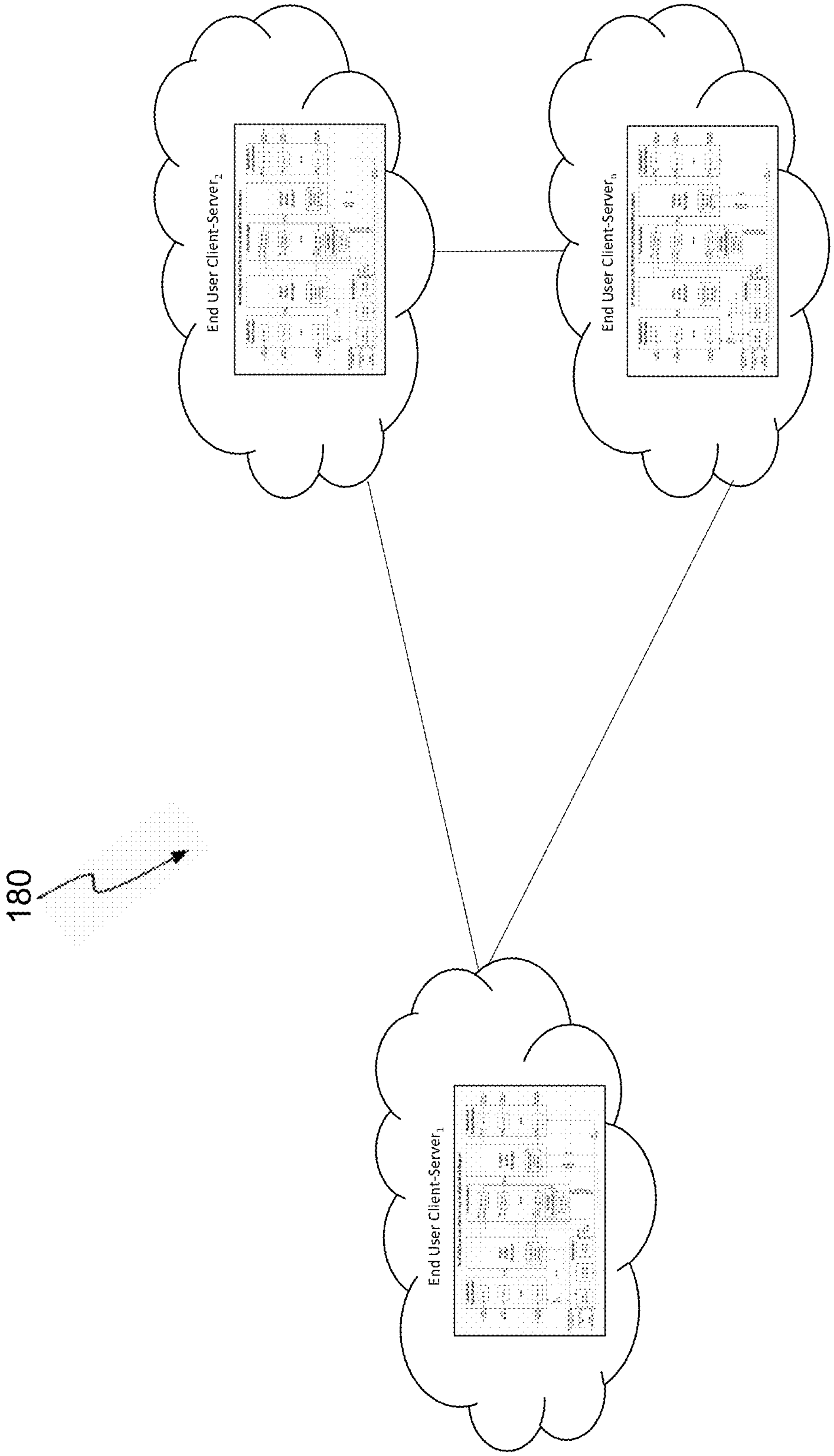
FIG. 13 shows a no-code/low-code platform with M-S TALPs embodied on a decentralized peer-to-peer ad hoc system, in accordance with embodiments of the present invention.

FIG. 13 shows the present invention embedded in a no-code/low-code platform that is embodied in a decentralized peer-to-peer ad hoc system 180. This embodiment allows geographically associated users to share mobile resources including computational, memory, and algorithmic within a transmitter/receiver-based network and has a higher security risk as unvetted/unregistered users share logical and physical resources. Device dropouts are even greater than with decentralized cell network ad hoc embodiments as devices can enter and leave the smaller direct transmission range rapidly, forcing the need for even greater redundancy. Typically, the physical equipment is heterogeneous and, therefore, balancing processing time across multiple heterogeneous devices becomes very important, especially if a script processes in parallel. Determining the originator, and thus owner, of a no-code/low-code application is also important. Although this embodiment is useful for groups, it is ill-suited when security is a primary concern, eliminating its use for most for-profit commercial entities. The transmission range limitations also make this embodiment ill-suited for rural users.

FIG. 14 shows an example of advanced space prediction (memory allocation) polynomial generation 190 whereby one term could be added to or subtracted from the polynomial. Resolving whether the term is added to or subtracted from the polynomial can be accomplished using the maximum error calculation. This means that the correct polynomial of a set of possible polynomials can be automatically selected. In this case correct means the polynomial that best predicts an advanced time or space complexity outcome given a set of appropriate input variable attribute values.

The analytics used by the M-S TALP Analysis Engine in FIG. 7 and FIGS. 9-13 are constructed by first generating execution pathways through the no-code/low-code source code and then using those execution pathways to build polynomials that approximate advanced time complexity, space complexity, speedup, and freeup. Consider the general definition of an algorithm: any sequence of operations that can be simulated by a Turing-complete system. An algorithm can contain multiple sequences of operations combined using conditional statements (if, switch, else, conditional operator, etc.) and organized as software processes. Data transformation results, timings, and time predictions are associated with a particular pathway through the process, implying that there can be multiple such results associated with any process. Since a process can contain multiple sequences of operations (pathways), the processing time of the process is dependent on which pathway is selected and, thus, is a process containing multiple pathways temporally ambiguous until a pathway is selected, defined as Turing's temporal ambiguity (TTA).

Consider a McCabe linearly independent pathway (LIP). McCabe's LIP consists of linear sequences of operations, called code blocks, connected together using conditional statements with known decisions; a LIP is a simple algorithm within the body of the complex algorithm. A code block within a LIP contains any non-conditional statement, including assignment statements, subroutine calls, or method calls, but not conditional loops. A LIP treats each conditional loop as creating a separate pathway, so changes in processing time due to changes in loop iterations cannot be tracked for the end-to-end processing time of the simple algorithm. Consider, however, that loops merely change the number of iterations of linear blocks of code, not the code blocks themselves, as the algorithm processes data end-to-end.

Since it is desirable to track changes in processing time for the end-to-end processing of an algorithm, and since changes in processing time are due to changes in the number of loop iterations (standard loops or recursion), the concept of a TALP includes loops as part of that pathway. That is, unlike a LIP, a TALP's code blocks can contain one or more loops. By allowing loops as part of the same pathway, it is possible to show how time can vary for the end-to-end linear processing of each pathway. Calculating the timing changes from a TALP's dataset size or input attribute values on a per-TALP basis and selecting a TALP allows for the resolution of TTA.

M-S TALPs represent the set of no-code/low-code linked components and are used to calculate no-code/low-code real-time software analytics: advanced time complexity, advanced space complexity, advanced speedup, and freeup. These real-time software analytics are represented as functions relating various M-S TALP input variable attribute values with changes in memory allocation and processing time. It can be very difficult to determine the real-time software analytical functions; however those functions can be approximated using polynomials.

Like advanced time complexity or advanced space complexity, an algorithm or process is first decomposed into execution pathways.

If the processing time of an algorithm or the memory allocation of an algorithm change monotonically with input dataset size, then, as with advanced time and space complexity, it is possible to create a table of monotonic input dataset size values "d" and their associated resultant monotonic space values "s" using a binary search technique coupled with a simple subtraction to generate a space prediction polynomial, that is, an approximation of the space complexity function. This technique is a polynomial generator and will be used to generate all real-time software analytic function approximation polynomials for all M-S TALPs of a no-code/low-code application.

Polynomial Generation

Various tables used in the process of polynomial generation are shown in FIGS. 14A-14F. A table called the Source Values table 200 containing ordered, scaled input dataset sizes and associated scaled space values (e.g., Table 201) is compared to a table called the Target Values table 202 containing a set of scaled dataset sizes and associated space values generated from some pre-existing functions depicted as the column headers, following the steps below.

1. A value for an input dataset size "d" is divided evenly and successively (varying the input dataset size) then the M-S TALP's associated executable code is executed by the system to find the associated space values "s" which are sorted and stored in the Input Dataset Size and Space table 201, as shown in FIG. 14A.
2. The input dataset size "d" and associated space values "s" are scaled by their respective smallest received values, $d_{min}$ and $s_{min}$, and saved in a Source Values table 200, as shown in FIG. 14B. In this example, $d_{min}=2$ and $s_{min}=3$. Scaling gives the Source Values table.
3. The scaled space values "s" of the Source Values table is compared to those found in a previously created Target Values table 202, as shown in FIG. 14C.
4. The functions (polynomial terms) in the headers of the columns of the Target Values table are in ascending order. Any zero value in the Target Values table is not compared to its corresponding Source Values table space value, but not comparing a row does not eliminate the corresponding Target table column function header from consideration for inclusion in the final polynomial. When comparing the Source Values table space values to corresponding Target Values table space values, all Source Values table s values in a column must be one of the following:

1) Greater than or equal to all associated Target Values table values in a column,
2) Less than or equal to all associated Target Values table values in a column, or
3) All Source Values table e values are the same value.

The function header of any Target Values table column whose rows do not meet condition a or condition b above is eliminated from consideration for inclusion in the final polynomial, and a comparison is made using a different target column. If condition c is met, the value is considered a constant and added to a Saved Term List $f_{term}$. Condition c means the polynomial is complete, and the process jumps to Step 8.

5. When Source space values are compared to the corresponding Target space values, the closest column header that meets condition a or b is saved in the $f_{term}$ list and the process continues with Step 6. If no tested columns meet condition a or b then an error condition exists, and the "Error—stop processing" message is displayed. This comparison is a binary search process.
6. The selected Target Values table column's values are subtracted from the corresponding Source Value table space values, and those new values are saved in a temporary Source Values table. If the temporary Source space values contain any negative values, then the following found polynomial term may be a negative term in which case two versions of the term (negative and positive) are saved with the one whose maximum error (as calculated in step 9) is the smallest, becoming the selected version. The absolute values of the temporary Source space values are saved as the new Source Values table 203, as shown in FIG. 14D.
7. If there are any computed zero values in the new Source Values table, the values of the current column below the zero are shifted to the row above, replacing the zero value, as shown in the process 204 of FIG. 14E. Step 4 is then repeated using the new Source Values table.
8. All saved terms in the $f_{term}$, list are summed, creating the predictive, monotonic polynomial $2_v(d)$ for input variable attribute d. To de-scale this polynomial with its resulting scaled space value "s," it is multiplied by the smallest original s value, called $s_{min}$, within the original Source Values table.

Variable Space Complexity as Monotonic Polynomial — Equation 2

$$2_v(d) = s_{min} \times \sum\nolimits_{i=1}^{n} f_{term_i}$$

Variable Time Complexity as Monotonic Polynomial — Equation 3

$$T_v(d) = s_{min} \times \sum\nolimits_{i=1}^{n} f_{term_i}$$

Coefficients are automatically calculated from this step. Two or more like terms are summed to produce the coefficient of the term. For example, summing $s^2$ and $s^2$ gives $2s^2$.

Polynomial Generation Example

If the set of s values={1, 3, 13} and d={1, 2, 4} generated from $s=d^2-d+1$, the steps above are shown in the tables 205, as depicted in FIG. 14F. Note that these tables combine the Source and Target table values in a modified format.

9. To test the accuracy of each possible predictive monotonic polynomial, each is executed using the same values used to generate the original Source Values table. The polynomial-computed values are compared to the actual values, giving the maximum percentage difference as the maximum error, $\text{Error}_{max}$. The predictive monotonic polynomial that has the minimum error is the one selected for use.

Maximum Space Complexity Polynomial Error Calculation — Equation 4

$$\text{Error}_{max} = \max\left(\left\{\frac{|s_1 - 2_v(d_1)|}{s_1} \times 100, \frac{|s_2 - 2_v(d_2)|}{s_2} \times 100, \ldots, \frac{|s_i - 2_v(d_i)|}{s_i} \times 100,\right\}\right)$$

Maximum Time Complexity Polynomial Error Calculation — Equation 5

$$\text{Error}_{max} = \max\left(\left\{\frac{|s_1 - T_v(d_1)|}{s_1} \times 100, \frac{|s_2 - T_v(d_2)|}{s_2} \times 100, \ldots, \frac{|s_i - T_v(d_i)|}{s_i} \times 100,\right\}\right)$$

The error here measures how closely the generated space prediction polynomial reflects the actual space complexity function. If $\text{Error}_{max}$ is greater than some epsilon, the polynomial cannot be used for prediction, and since the memory allocation for the algorithm cannot be predicted, the algorithm should be rejected as unstable. Knowing the space prediction error gives an advantage not only for algorithm selection but also in determining in real time the acceptability of a dataset for a given computing environment.

Figure 15:
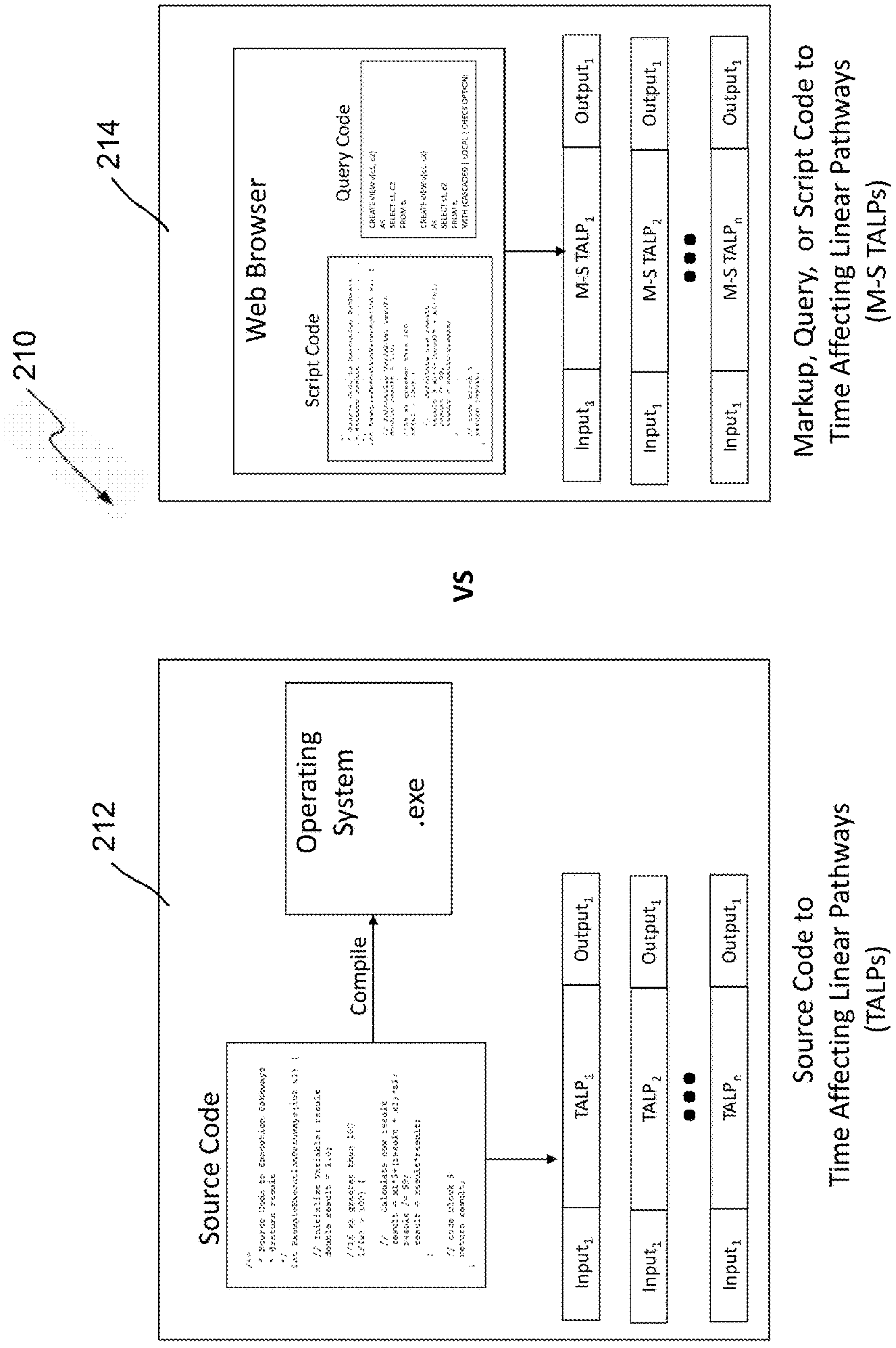
FIG. 15 shows the differences between the known TALP definition and the present invention's M-S TALP definition, in accordance with embodiments of the present invention.

FIG. 15 is a diagram 210 showing the differences between a conventional TALP processing 212 and an M-S TALP processing 214. A TALP is an execution pathway processing on an operating system using a compiled software code that is not associated with a design. This is different from the M-S TALP pathway discussed herein which is an uncompiled markup language, script language or database query that is interpreted and executed using a web browser on an operating system, making M-S TALPs differentiable from TALPs. Since the M-S TALPs can have looping structures, they are also differentiable from STALPs.

Figure 16:
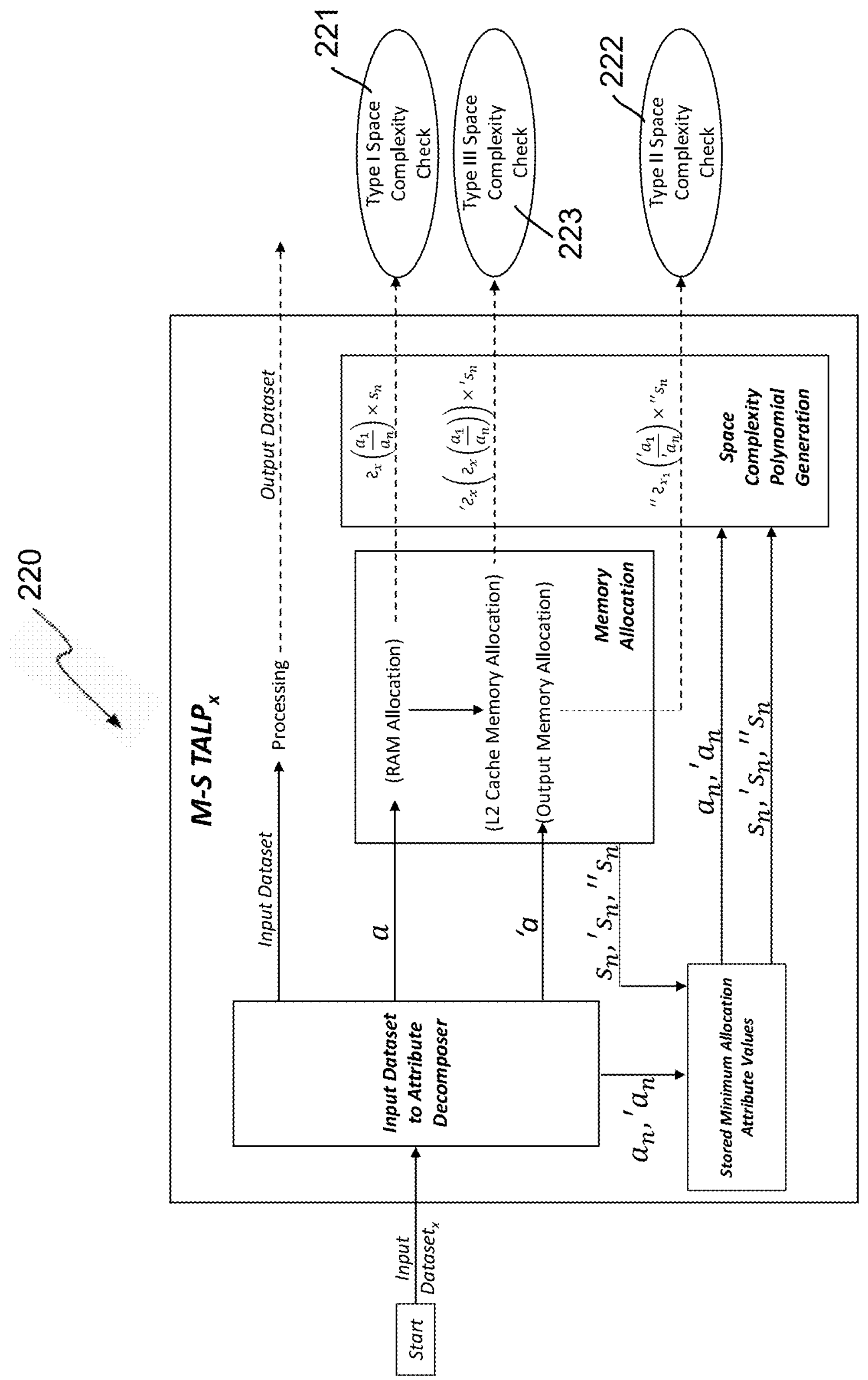
FIG. 16 shows a diagram of the calculation of type I, type II, and type II space complexity values, and the use of these values in space availability checks, relating the input variable attribute a to random access memory allocation (type I space complexity) and the L2 cache memory allocation (type II space complexity), in accordance with embodiments of the present invention. The input variable attribute 'a relationship to the output memory allocation (type II) space complexity is also shown, in accordance with embodiments of the present invention.

FIG. 16 shows a diagram 220 of an M-S TALP receiving a set of input variable attributes and how those attributes are used to determine three different types of advanced space prediction polynomials that approximate advanced space complexity functions. These polynomials are used to calculate allocation values.

Type I advanced space complexity allocation value $S_{RAM}$ 221 represents the RAM allocation value in bytes given some set of scaled input variable attribute values $a_1/a_n$. The subset $a_1$ of the input variable attribute values is scaled by dividing by the smallest minimum values an of input attribute values used to generate the type I advanced space prediction polynomial $2_x$. Descaling is accomplished by multiplying the scaled value from the type I space complexity approximation polynomial $2_x(a_1/a_n)$ by the minimum allocation value $s_n$ used in the construction of $2_x(a_1/a_n)$. The scaled value $a_1/a_n$ also represents the maximum possible number processing elements n if parallel processing is used with the current input attribute values.

Equation 6 Calculating Type I Advanced Space Complexity Values for No-Code/Low-Code M-S $TALP_x$ $$s_{RAM} = ?_x\left(\frac{a_1}{a_n}\right) \times s_n$$

Type II advanced space complexity allocation value $S_{L2CM}$ 222 represents the L2 cache memory allocation value in bytes given some set of scaled input variable attribute values $a_1/a_n$. As for Equation 6, the subset $a_1$ of the input variable attribute values is scaled by dividing by the smallest minimum values $a_n$ of input attribute values used to generate the type II advanced space prediction polynomial $?_x$. However, descaling is accomplished by multiplying the scaled value from the type II space complexity approximation polynomial $'?_x(?_x(a_1/a_n))$ by the minimum allocation value $'s_n$ used in the construction of $'?_x(?_x(a_1/a_n))$.

Equation 7 Calculating Type II Advanced Space Complexity Values for No-Code/Low-Code M-S TALPx $$s_{L2CM} = {'?_x}\left(?_x\left(\frac{a_1}{a_n}\right)\right) \times {'s_n}$$

Type III advanced space complexity allocation value $s_{OM}$ 223 represents the output memory allocation value in bytes given some set of scaled input variable attribute values $'a_1/'a_n$. The subset $'a_1$ of the input variable attribute values is scaled by dividing by the smallest minimum values $'a_n$ of input attribute values used to generate the type III advanced space prediction polynomial $''?_x$. Descaling is accomplished by multiplying the scaled value from the type II space complexity approximation polynomial $''?_x('a_1/'a_n)$ by the minimum allocation value $''s_n$ used in the construction of $''?_x('a_1/'a_n)$.

Equation 8 Calculating Type III Advanced Space Complexity Values for No-Code/Low-Code M-S TALPx $$s_{OM} = {''?_x}\left(\frac{'a_1}{'a_n}\right) \times {''s_n}$$

Figure 17:
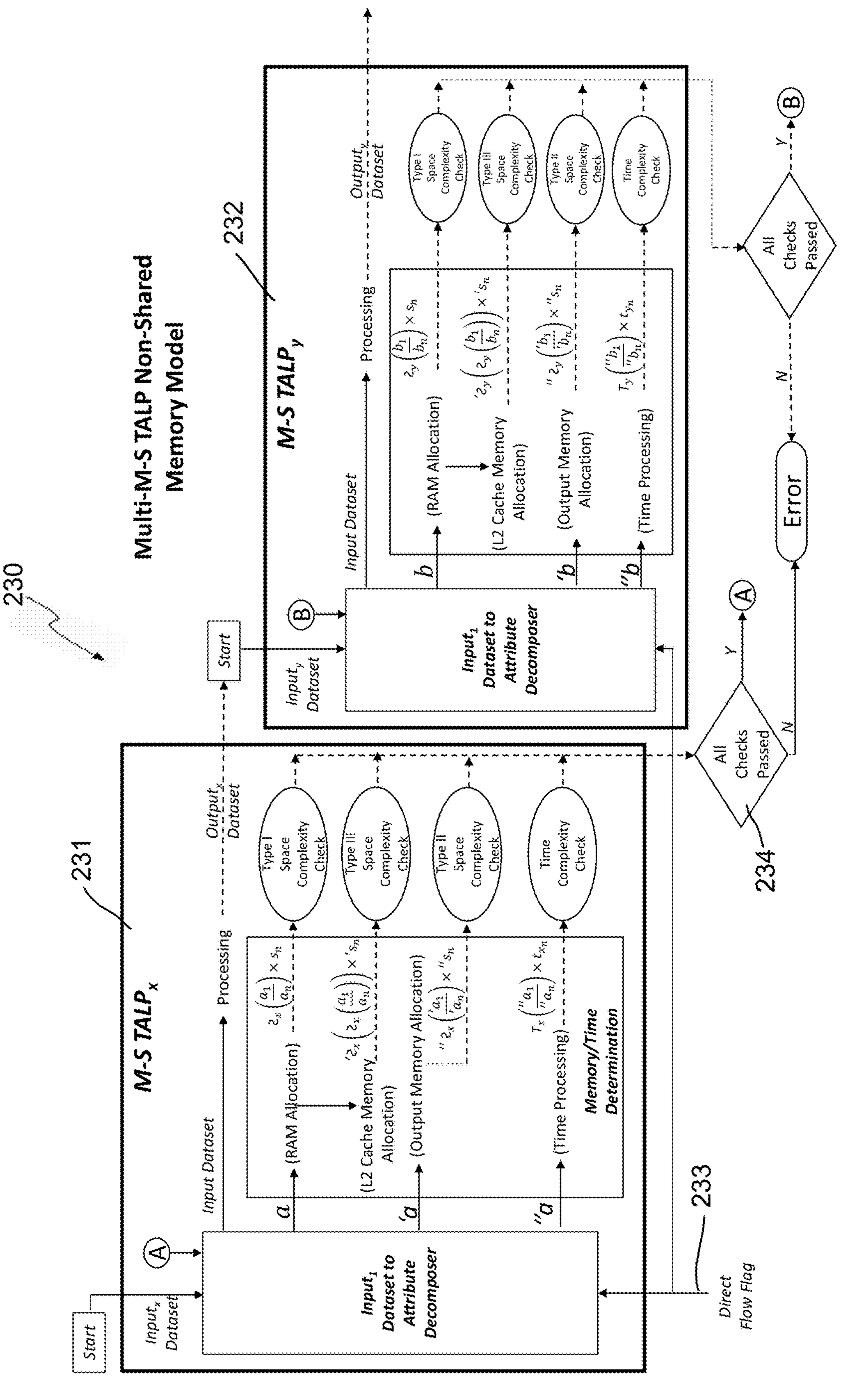
FIG. 17 shows a diagram of the maximum type I, type II, and type II memory allocation from two linked M-S TALPs where the memory allocation of both M-S TALPs are not summed, in accordance with embodiments of the present invention.

These equations make it possible for the system to automatically associate sets of input variable attribute values to type I, II, and III advanced space complexity. Uses include the ability to determine the following prior to actual execution of a given application:

1) If a given input dataset can be processed by the current application given the current hardware RAM constraints
2) If a given input dataset can be processed by the current application given the current hardware cache memory constraints
3) If a given input dataset can be processed by the current application given the current hardware output memory constraints FIG. 17 shows a diagram 230 of how to generate the M-S TALP analytics of two (or more) linked M-S TALPs (e.g., 231, 232) where memory allocation restarts upon the start of execution for each M-S TALP. The effects of an input dataset on an M-S TALP's memory allocation or on the M-S TALP's output variable attribute memory allocation as well as the processing results of an M-S TALP can be known. An M-S TALP receives the input dataset, of which some or all can be used to generate memory allocation and/or output memory allocation.

For each linked M-S TALP 231, 232, a type I, type II, and type II space complexity analytic and an advanced time complexity analytic are generated. These analytics are tested for errors or non-compliance prior to executing the following M-S TALP in the link.

This diagram (FIG. 17) shows that it is possible for the system to be able to automatically detect runtime errors and to terminate the execution of a set of linked M-S TALPs after any M-S TALP detected error. M-S $TALP_y$ 232 shows the calculation of the advanced time complexity from a set of input variable attribute values, "a. Detected temporal and/or spatial errors are automatically characterized and can be used for debugging purposes. There can be two linked processing access methods: direct flow and checked flow.

1) Direct flow—the direct flow method of connecting two M-S TALPs first requires the system to check the direct flow flag 233. If set, the system then executes the preceding M-S TALP. Next, using some or all of the output variables of the preceding M-S TALP, the system executes the succeeding M-S TALP.
2) Checked flow—the checked flow method of connecting two M-S TALPs first requires the system to check 234 the direct flow flag. If not set, then the system, using the input variable attributes of the preceding M-S TALP, determines if that M-S TALP's execution will be valid. If the preceding M-S TALP is expected to be valid then the input variable attribute values of that M-S TALP are processed. The subset of the output variable attribute values of the preceding M-S TALP that is used as input to the succeeding M-S TALP is checked to determine if the succeeding M-S TALP's execution is anticipated to be valid. If the anticipated succeeding M-S TALP execution is determined to be valid then the system executes the succeeding M-S TALP using the subset of the preceding M-S TALP's output attribute values used as input. If the succeeding M-S TALP's execution is anticipated to be invalid, then an anticipated error condition has occurred, and the application stops processing. The anticipated error condition along with its associated M-S TALP can be made available to the system's user.

A TALP's processing time, t, is calculated from the advanced time prediction polynomial $T_x(a_1/a_n)$ that approximates the scaled time complexity function. For M-S TALPs, this advanced time prediction polynomial $T_x(\ )$ uses the input attribute values that affect processing time $''a_1$ scaled by the smallest input variable attribute values $''a_n$ used to generate the polynomial to give scaled processing time. The scaled processing time is descaled using the smallest processing time detected while generating $T_x(\ )$, giving the actual predicted processing time, t.

Equation 9 Calculating Advanced Time Complexity Value $$t = T_x\left(\frac{''a_1}{''a_n}\right) \times t_n$$

Figure 18:
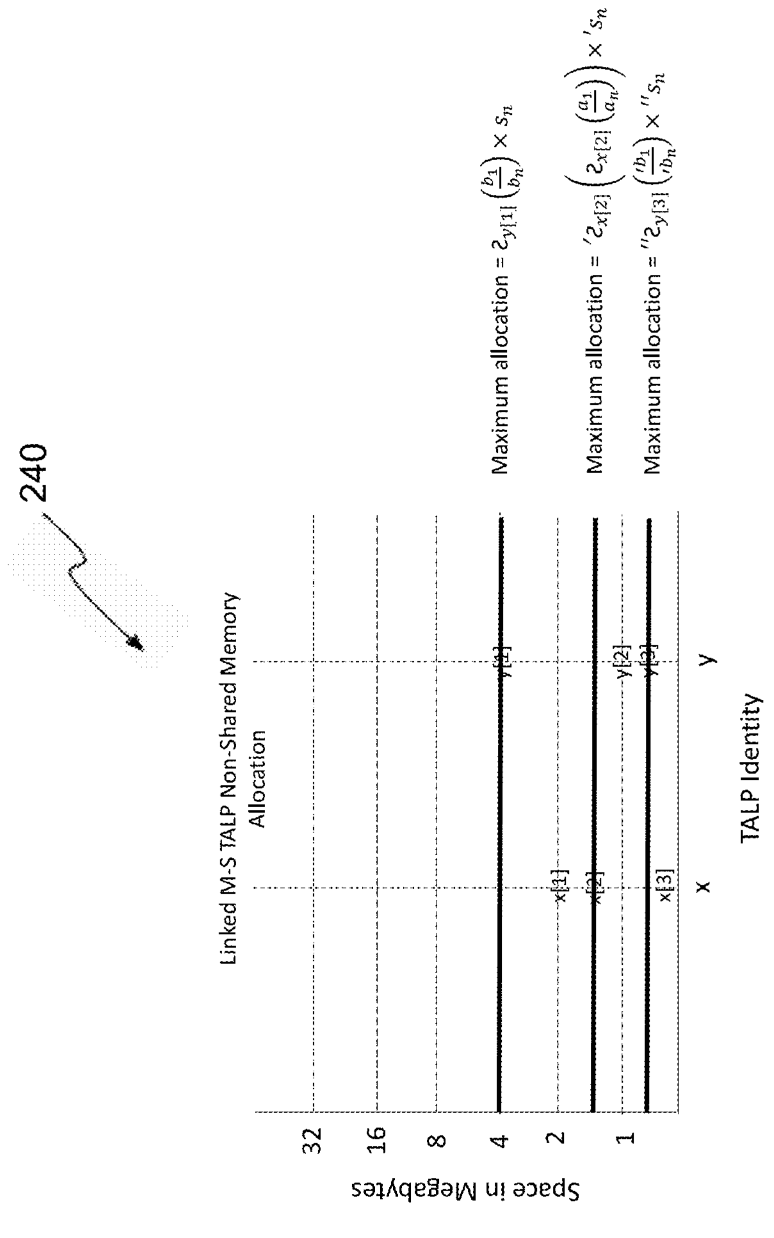
FIG. 18 shows a graph of the maximum type I, type II, and type II memory allocation from two linked M-S TALPs that do not share memory or whose memory allocations do not sum, in accordance with embodiments of the present invention.

The total anticipated processing time, $t_{total}$, is the sum of the advanced time complexities of all linked M-S TALPs:

Total Processing Time for a Set of Linked $M\text{-}S\ TALPs$ Equation 10

$$t_{total} = \sum_{m=1}^{\#\ linked\ M-S\ TALPs} T_m\left(\frac{''a_{m_1}}{''a_{m_n}}\right) \times t_{m_n}$$

Where $m$ = number of linked $M\text{-}S\ TALPs$ $''a_{m_1}$ = set of input variable attributes for the $m^{th}$ $M\text{-}S\ TALP$ $''a_{m_n}$ = minimum input variable attribute value used to generate $T_m()$ $t_{m_n}$ = minimum processing used to generate $T_m()$ FIG. 18 shows a graph 240 of the maximum memory allocation of two M-S TALPs when the memory allocation is reset between M-S TALPs. If the preceding M-S TALP resets its memory allocation prior to calling the succeeding M-S TALP then each M-S TALP's memory allocation stands alone. Therefore, the space complexity checks of the succeeding M-S TALP are analogous to the preceding M-S TALP's checks.

Figure 19:
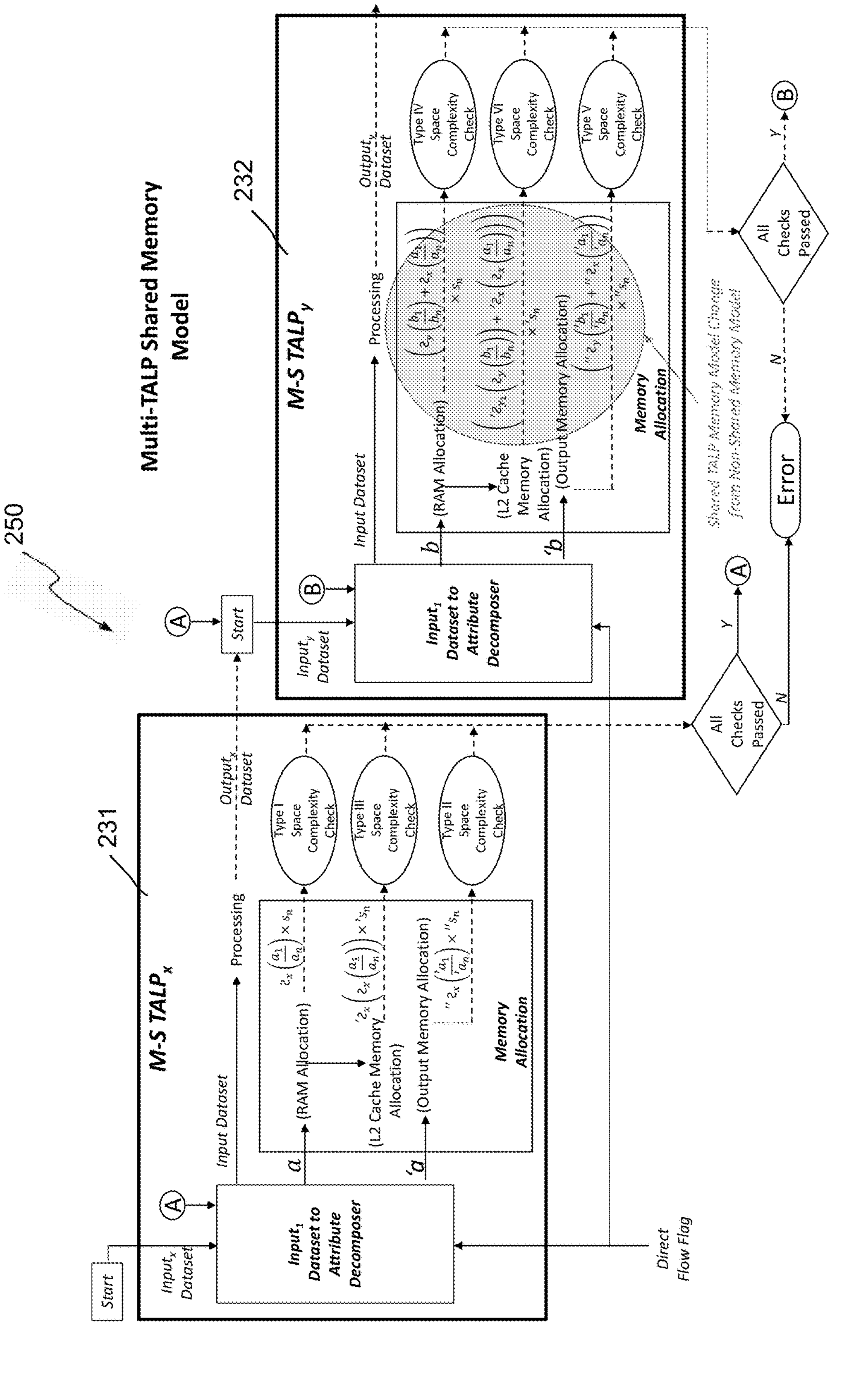
FIG. 19 shows a diagram of the maximum type I, type II, and type II memory allocation from two linked M-S TALPs where the memory allocation of the preceding M-S TALP is added to the memory allocation of the succeeding M-S TALP, in accordance with embodiments of the present invention.

FIG. 19 is a diagram 250 showing how to generate the M-S TALP spatial analytics of two linked M-S TALPs (e.g., 231, 232) where memory allocation does not reset between the M-S TALPs. As the temporal analytics are unaffected, they are not shown in this diagram. When the memory allocation is not reset between the executions of linked M-S TALPs, the analysis of the preceding M-S TALP is the same as was discussed for the case where the memory allocation is reset. However, the analysis for the succeeding M-S TALP differs as the memory allocation includes the prior M-S TALP's allocation plus any additional allocation required by the succeeding M-S TALP. Three new advanced space prediction polynomials can be generated that approximate the advanced space complexity functions that are used to predict the maximum memory allocation as the sum of the linked M-S TALPs that do not reset memory between them.

Calculating Type $IV$ Advanced Space Complexity Maximum Linked RAM Values Equation 11

$$s_{RAM_{max}} = \sum_{y=1}^{m}\left(\mathfrak{z}_y\left(\frac{a_{1_y}}{a_{n_y}}\right) \times s_{n_y}\right)$$

Where $m$ = the maximum number of linked $M\text{-}S\ TALPs$ with additive memory $y$ = a designator for a particular linked $M\text{-}S\ TALP$ in a list whose $RAM$ allocation is additive $\mathfrak{z}_y()$ = the $y^{th}$ scaled polynomial which approximates $RAM$ allocation given input variable attributes $a_{1_y}$ = the input values of the $y^{th}$ $RAM$ allocation polynomial $a_{n_y}$ = the minimum input variable value used to generate the $y^{th}$ $RAM$ allocation polynomial $s_{n_y}$ = the minimum allocation value found when generating the $RAM$ allocation polynomial Calculatin Type $V$ Advanced Space Complexity Maximum Linked $L2CM$ Values Equation 12

Figure 20:
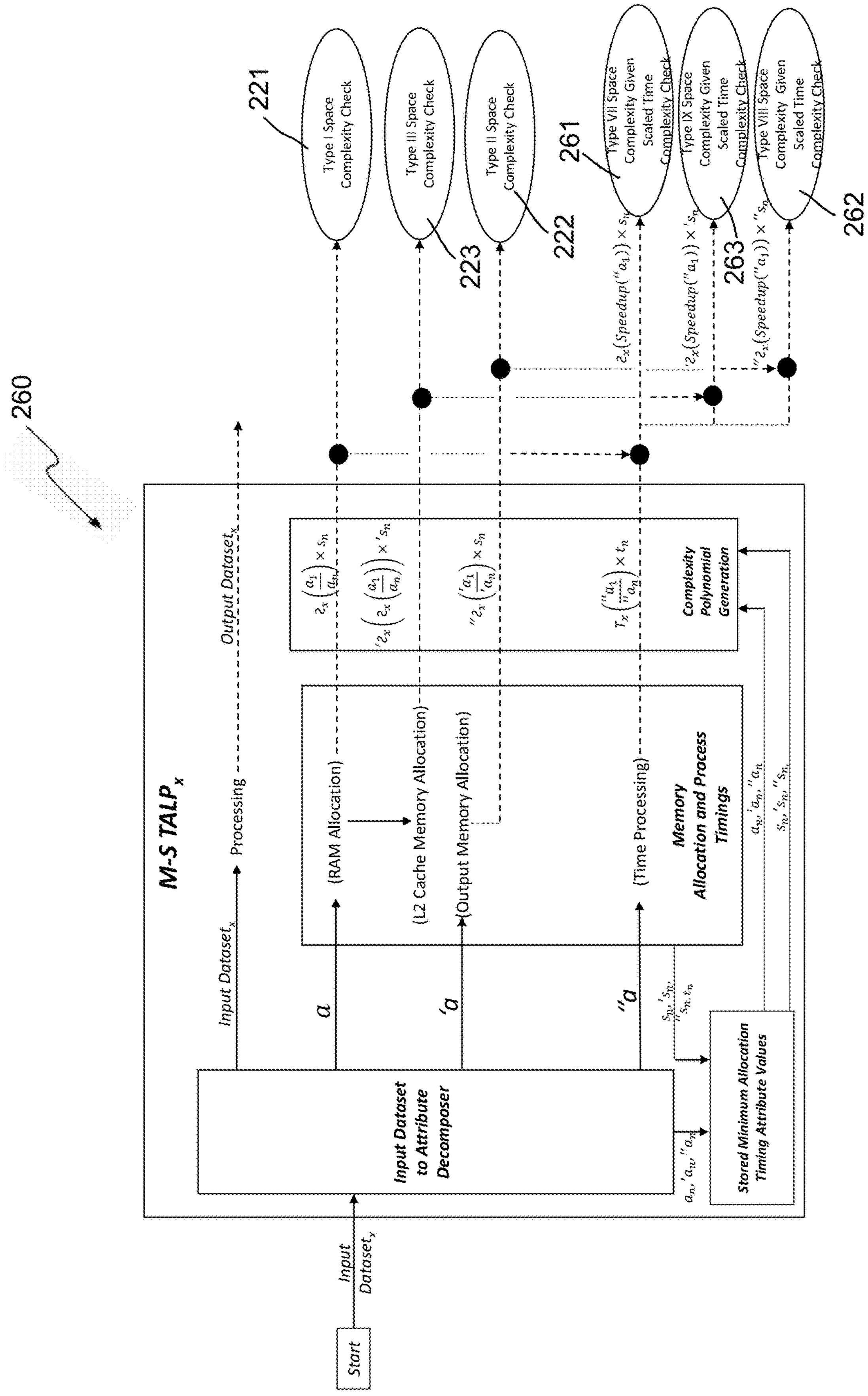
FIG. 20 shows a diagram which extends the diagram of FIG. 16 to include the calculation of advanced scaled time complexity values, from the input variable attribute "a, called speedup, in accordance with embodiments of the present invention. Type I, type II, and type II space complexity values are shown to be calculable using speedup, in accordance with embodiments of the present invention.

-continued $$s_{L2CM_{max}} = \sum_{y=1}^{m}\left('\mathfrak{z}_y\left(\mathfrak{z}_x\left(\frac{a_1}{a_n}\right)\right) \times s_{n_y}\right)$$

Where $'\mathfrak{z}_y()$ = the $y^{th}$ scaled polynomial which approximates $L2CM$ allocation given input variable attributes Calculating Type $VI$ Advanced Space Complexity Maximum Linked $OM$ Values Equation 13

$$s_{OM_{max}} = \sum_{y=1}^{m}\left('\mathfrak{z}_y\left(\frac{'a_{1_y}}{'a_{n_y}}\right) \times {''s_{n_y}}\right)$$

Where $'\mathfrak{z}_y()$ = the $y^{th}$ scaled polynomial which approximates $OM$ allocation given input variable attributes $'a_{1_y}$ = the input values of the $y^{th}$ $OM$ allocation polynomial $'a_{n_y}$ = the minimum input variable attribute value used to generate the $y^{th}$ $OM$ allocation polynomial $''s_{n_y}$ = the minimum allocation value found when generating the $OM$ allocation polynomial FIG. 20 is a diagram 260 showing that type I, II, and III advanced space complexity (e.g., 221, 222, 223) for an M-S TALP can be determined from the speedup function of advanced time complexity. Scaled advanced time complexity from the input variable attribute "a is called speedup (e.g., 261, 262, 263). The scaled advanced time complexity function, or speedup, must be approximated using the input variable attributes values "$a_1$ and the minimum input variable attribute values used to approximate the time prediction polynomial "$a_n$ giving:

Speedup as Scaled Advanced Time Complexity Equation 14

$$\text{Speedup}\ (''a_1, ''a_n) = T_x\left(\frac{''a_1}{''a_n}\right)$$

Since speedup is a scaled value, it is possible to use speedup as the input value for the three advanced space prediction polynomials that approximate space complexity functions of Equations 6 through Equation 8 to calculate allocation values.

Calculating Type $VII$ Advanced Space Complexity Values (e.g., 261) for No-Code/Low-Code $M\text{-}s\ TALPx$ Equation 15

$$s_{RAM_{Speedup}} = \mathfrak{z}_x(Speedup(''a_1, ''a_n)) \times s_n$$

Calculating Type $VIII$ Advanced Space Complexity Values (e.g., 262) for No-Code/Low-Code $M\text{-}s\ TALPx$ Equation 16

$$s_{L2CM_{Speedup}} = '\mathfrak{z}_x(Speedup(''a_1, ''a_n)) \times {'s_n}$$

Calculating Type $IX$ Advanced Space Complexity Values (e.g., 263) for No-Code/Low-Code $M\text{-}s\ TALPx$ Equation 17

$$s_{OM_{speedup}} = ''\mathfrak{z}_x(Speedup(''a_1, ''a_n)) \times {''s_n}$$

Since Speedup ("$a_1$, "$a_n$) gives scaled processing time, it is possible to obtain the advanced time complexity value by simply descaling the speedup value. Thus, if the descaling factor is known for a given processing time t, speedup can be generated from the given processing time by dividing t by the smallest processing time generated when calculating $T_x(\ )$. Since speedup can be calculated using scaled processing time $t_1/t_n$, it is possible to know RAM, L2 cache, and output memory allocation from t. This changes Equation 6 through Equation 8 to calculate allocation values.

Calculating Type *VII* (*b*) Advanced Space Complexity Values from Processing Time — Equation 18

$$s_{RAM_{time}} = ?_x\left(\frac{t_1}{t_n}\right) \times s_n$$

Calculating Type *VIII* (*b*) Advanced Space Complexity Values from Processing Time — Equation 19

$$s_{L2CM_{time}} = '?_x\left(\frac{t_1}{t_n}\right) \times 's_n$$

Calculating Type *IX* (*b*) Advanced Space Complexity Values from Processing Time — Equation 20

$$s_{OM_{time}} = ''?_{x_1}\left(\frac{t_1}{t_n}\right) \times ''s_n$$

Figure 21:
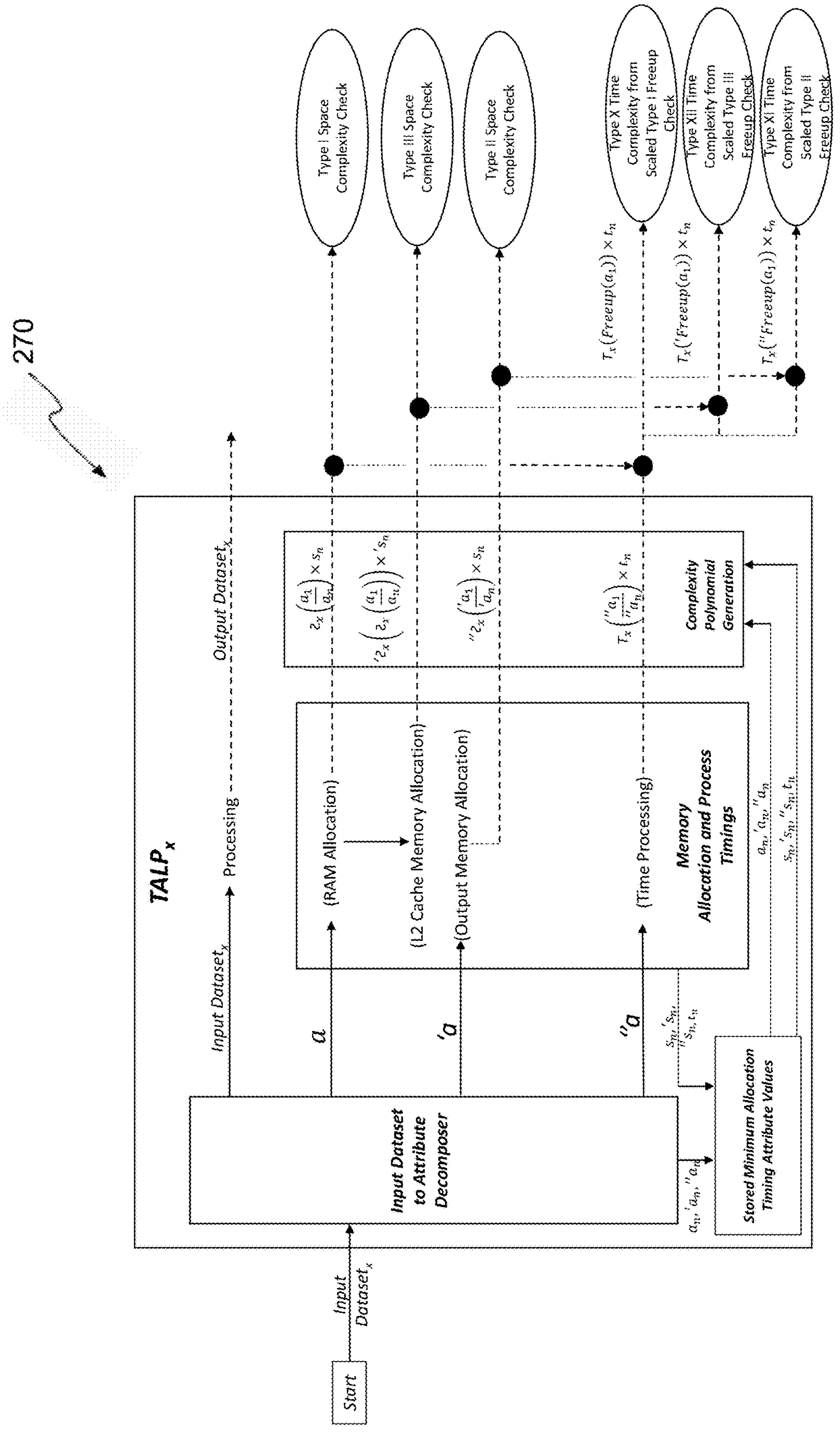
FIG. 21 shows a diagram which extends the diagram of FIG. 16 to include the use of advanced scaled space complexity, called freeup, in accordance with embodiments of the present invention. Advanced time complexity values are shown to be calculable using type I, type II, or type II freeup, in accordance with embodiments of the present invention.

FIG. 21 shows a diagram 270 whereby processing time is determined from the various freeup values. Scaled advanced space complexity is called freeup. Given Freeup ($a_1$, $a_n$) gives predicted scaled random access memory allocation values, 'Freeup ($a_1$, $a_n$) gives predicted scaled L2 cache memory allocation values, and "Freeup ('$a_1$, '$a_n$) gives predicted scaled output memory allocation values, it is possible to obtain the processing time values by simply using the plethora of generated freeup values as the scaled inputs for the advanced time prediction polynomial that approximates the time complexity function.

Advanced Time Complexity Value from Type *I* Freeup — Equation 21

$$t = T_x(Freeup(a_1, a_n)) \times t_n$$

Advanced Time Complexity Value from Type *II* Freeup — Equation 22

$$t = T_x('Freeup(a_1, a_n)) \times t_n$$

Advanced Time Complexity Value from Type *III* Freeup — Equation 23

$$t = T_x(''Freeup('a_1, 'a_n)) \times t_n$$

Figure 22:
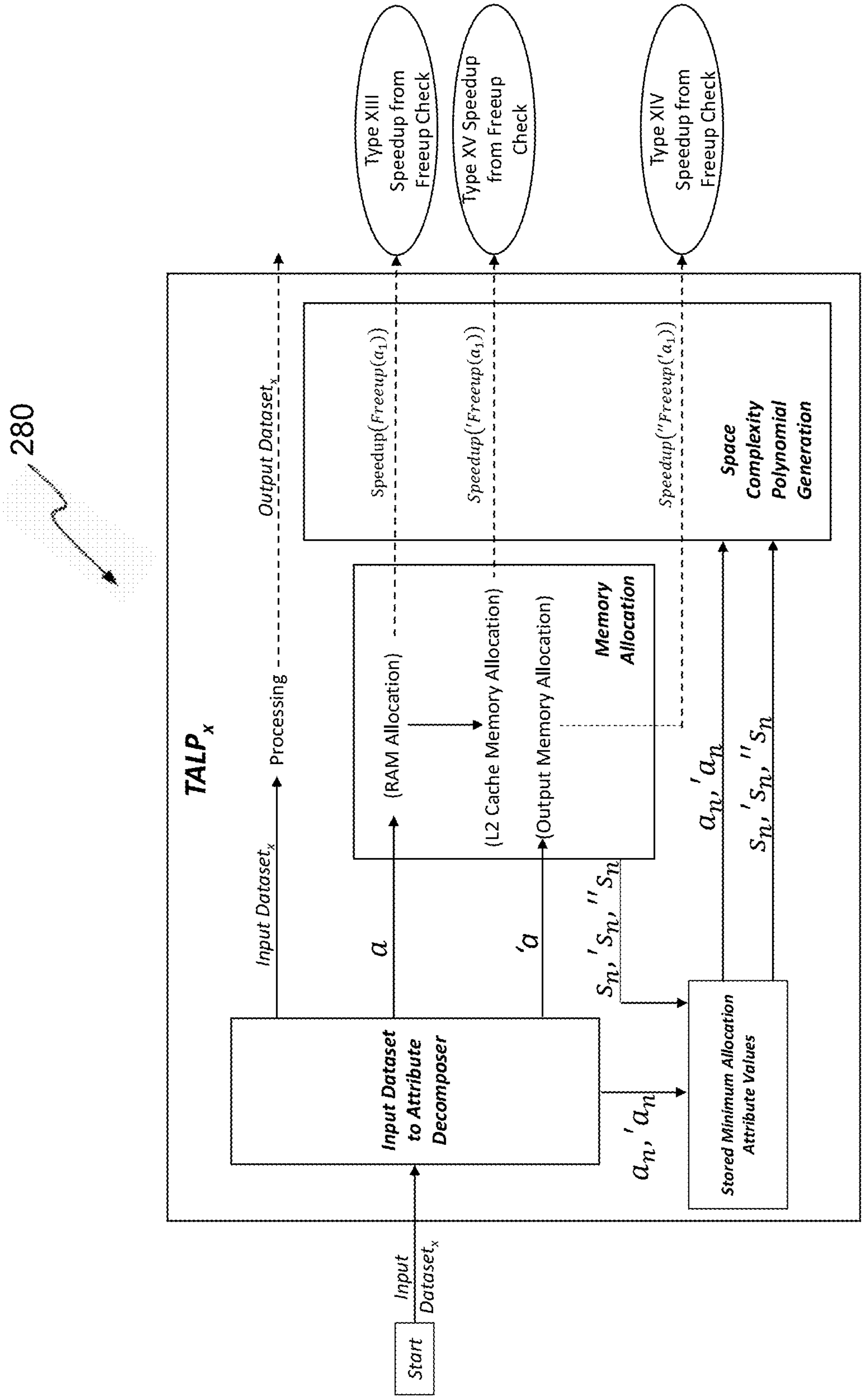
FIG. 22 shows a diagram where advanced speedup values are calculable using type I, type II, or type II freeup, in accordance with embodiments of the present invention.

FIG. 22 shows a diagram 280 whereby scaled processing time values are determined by using the three freeup types as the input values in the speedup function. Given S is the symbol for speedup, then:

Advanced Speedup Value from Type *I* Freeup — Equation 24

$$S = \frac{t_1}{t_n} = \text{Speedup (Freeup }(a_1))$$

Advanced Speedup Value from Type *II* Freeup — Equation 25

$$S = \frac{t_1}{t_n} = \text{Speedup ('Freeup }(a_1))$$

-continued

Scaled Advanced Speedup Value from Type *III* Freeup — Equation 26

$$S = \frac{t_1}{t_n} = \text{Speedup (''Freeup }('a_1))$$

Figure 23:
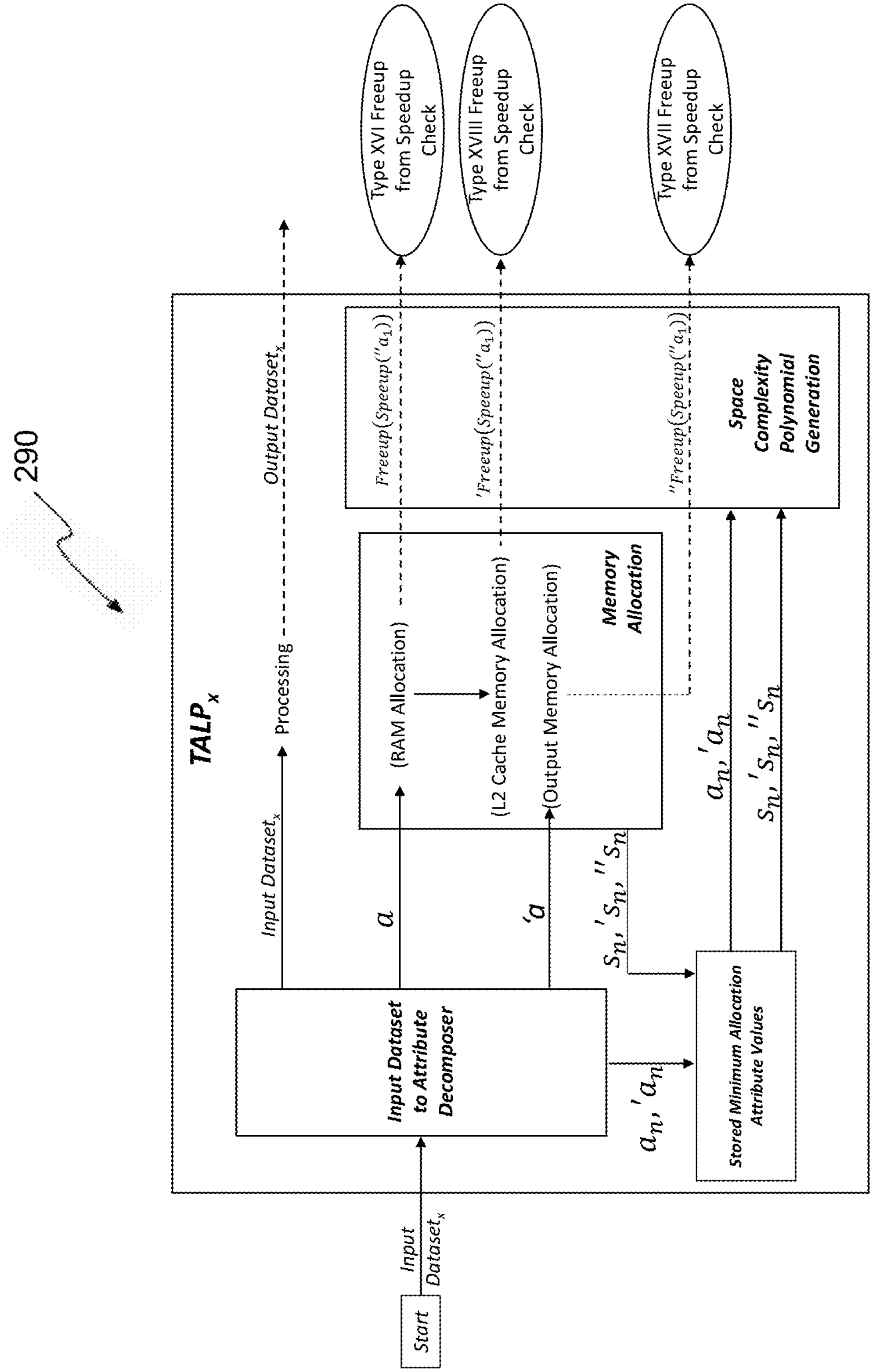
FIG. 23 shows a diagram where type I, type II, and type II freeup values are calculable using advanced speedup, in accordance with embodiments of the present invention.

FIG. 23 shows a diagram 290 whereby the scaled space complexity values for RAM, L2 cache, and output memory allocation in bytes are determined. Advanced speedup is used as the input value for the three types of freeup functions. Given F is the symbol for freeup, then:

Type *I* Freeup Value from Advanced Speedup — Equation 27

$$F = \frac{s_{1_{RAM}}}{s_{n_{RAM}}} = \text{Freeup (Speedup (}''a_1))$$

Type *II* Freeup Value from Advanced Speedup — Equation 28

$$F = \frac{s_{1_{L2CM}}}{s_{n_{L2CM}}} = \text{'Freeup (Speedup (}''a_1))$$

Type *III* Freeup Value from Advanced Speedup — Equation 29

$$F = \frac{s_{1_{OM}}}{s_{n_{OM}}} = \text{''Freeup (Speedup (}''a_1))$$

Given $t_n$ as the scale factor, it is possible to use processing time t in place of speedup.

Type *I* Freeup Value from Processing Time — Equation 30

$$F = \frac{s_{1_{RAM}}}{s_{n_{RAM}}} = \text{Freeup}\left(\frac{t_1}{t_n}\right)$$

Type *II* Freeup Value from Processing Time — Equation 31

$$F = \frac{s_{1_{L2CM}}}{s_{n_{L2CM}}} = \text{''Freeup}\left(\frac{t_1}{t_n}\right)$$

Type *III* Freeup Value from Processing Time — Equation 32

$$F = \frac{s_{1_{OM}}}{s_{n_{OM}}} = \text{'Freeup}\left(\frac{t_1}{t_n}\right)$$

Figure 24:
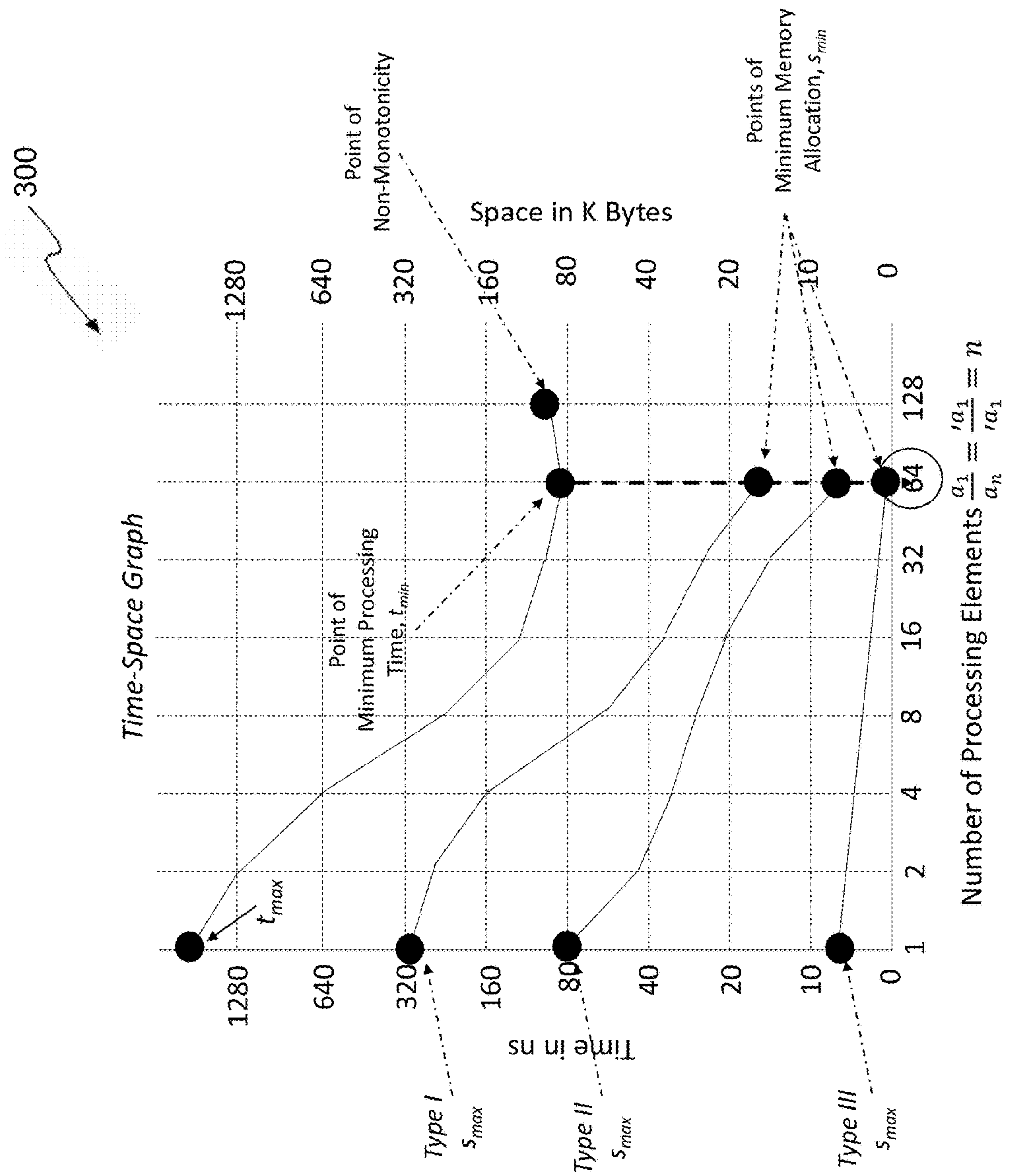
FIG. 24 shows a graph relating the minimum detected processing time to the minimum type I, type II, and type II advanced space complexity values, in accordance with embodiments of the present invention.

FIG. 24 shows a graph 300 linking the number of processing elements at which point the projected minimum processing time $t_{min}$, as calculated from the time complexity of some M-S TALP, occurs with the number of processing elements at which point the projected minimum type I, II or III space complexities $s_{min}$, $'s_{min}$, $''s_{min}$ occur. The scaled value $a_1/a_n$ also represents the maximum possible number processing elements n if parallel processing is used with the current input attribute values.

Figure 25:
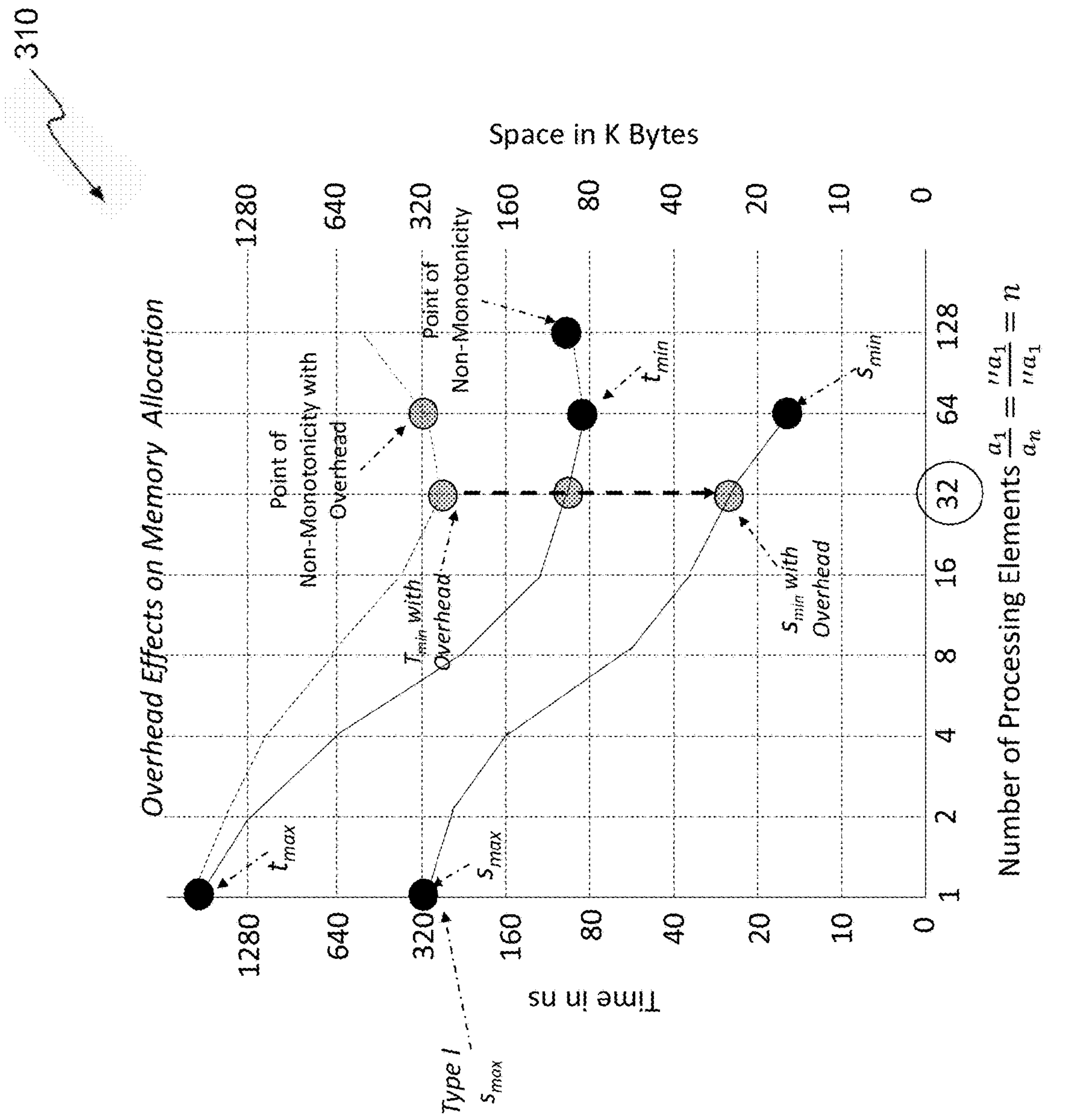
FIG. 25 shows a graph linking the minimum processing time detected from advanced time complexity at the point just prior to the point of non-monotonicity adjusted for the effects of overhead with the minimum value of the type I advanced space complexity also adjusted for overhead, in accordance with embodiments of the present invention.

FIG. 25 shows a graph 310 linking the number of processing elements at which point the projected minimum processing time $t_{min}$, as calculated from the time complexity of some M-S TALP, occurs with the number of processing elements at which point the minimum projected type I, II or III space complexities $s_{min}$, $'s_{min}$, $''s_{min}$ that have overhead occurred. Overhead is typically seen with cross-communication between two or more processing elements. As previously indicated, the scaled value $a_1/a_n$ also represents the maximum possible number processing elements n if parallel processing is used with the current input attribute values.

If an M-S TALP is executed using multiple parallel processing elements, there is a chance that there will be cross-communication overhead. It is possible to generate a cross-communication overhead time prediction polynomial that approximates a cross-communication overhead time complexity function 'T( ). This function relates a set of input variable attributes that affect open cross-communication overhead events to time, $t_c$. An open cross-communication overhead event is one whose data movement time is not obscured by either simultaneous data processing or another simultaneous cross-communication event. Cross-communication overhead time complexity adds to the processing time of a parallel event. This changes the time complexity function to cross-communication time complexity. Adding advanced cross-communication time complexity values, $t_c$, to their associated advanced time complexity values, t, gives the advanced time complexity with overhead values, $t_o$.

Calculating Advanced Cross-Communication Time Complexity Values — Equation 33

$$t_c = {}'T_x\left(\frac{''a_1}{''a_n}\right) \times {}'t_n$$

Calculating Advanced Time Complexity with Overhead Values — Equation 34

$$t_o = t + t_c = \left(T_x\left(\frac{''a_1}{''a_n}\right) \times t_n\right) + \left({}'T_x\left(\frac{''a_1}{''a_n}\right) \times {}'t_n\right)$$

M-S TALP Identification Using Speedup and Freeup

If two M-S TALPs use the same input variable types and generate the same output values and their speedup, freeup, RAM memory allocation, output memory allocation, and L2 cache memory allocation are the same, then they substantially represent the same algorithm, regardless of whether no-code or low-code modules are used.

In order to capture the identity of an M-S TALP, algorithmic behavior that is associated with the physical hardware must be eliminated by using the speedup and freeup functions rather than time complexity and space complexity. This is because both speedup and freeup are ratios. As long as the ratios remain the same, the hardware performance is irrelevant to M-S TASLP identification.

The three types of freeup (input to RAM memory allocation, input to L2 cache memory allocation, and input to output memory allocation) are scaled advanced space complexity functions. It has already been shown that each freeup type can be associated with speedup. Both the speedup and the type III output allocation freeup are visible, external to the low-code source code. This makes it possible to have an identity quick test that does not require the examination of low-code source code and is vitally important to no-code identification as in the no-code case, there is no source code to examine. This quick test allows for the elimination of obviously different M-S TALPs from consideration with minimum effort. A longer test for which source code visibility is required uses type I and type III RAM and L2 cache allocation freeup to complete the determination of M-S TALP equivalency. If the quick test indicates that multiple M-S TALPs might be equivalent, then the longer test can be applied to ensure equivalency.

Quick Identity Test

The following steps are required to perform the quick test to compare a given M-S TALP, with a valid input dataset, to a library of M-S TALPs, each of which already has associated input variable attributes that are used to generate speedup and the three freeup functions:

Step 1: An M-S TALP is selected from a library of M-S TALPs to compare to a given M-S TALP.

Step 2: Output values are generated for both the library M-S TALP and the given M-S TALP from the given valid input dataset. The set of output values of the library M-S TALP are compared to the output values of the given M-S TALP. If the sets of output values for the two M-S TALPs are equal then the test continues in step 3 and steps 2a and 2b are skipped.

2a: If there are no additional library M-S TALPs, then the quick test is complete.

2b: If there are additional library M-S TALPs to check then step 1 is repeated.

Step 3: Those input variable attributes that affect time of the library M-S TALP are associated with any corresponding input variable attributes of the given M-S TALP. A speedup predictive polynomial is created by varying the values of the given M-S TALP's corresponding input variable attribute values that affect time. A type II freeup predictive polynomial is created by varying the given M-S TALP's input variable attribute values that correspond to the library M-S TALP's input variable attributes that affect output memory allocation.

Step 4: The given M-S TALP's speedup and type II freeup are compared to the library M-S TALP's speedup and type II freeup by entering the values of the given M-S TALP's input variable attributes into the newly created speedup and freeup prediction polynomials and comparing the predicted results.

4a: If the predicted speedup and type II freeup values of the library M-S TALP and the given M-S TALP, using the same input values, are within an epsilon of each other then the long identity test is applied.

4b: If the predicted speedup and type II freeup values of the library M-S TALP and the given M-S TALP, using the same input values, are not within an epsilon of each other and there are additional library-stored M-S TALPs to check then step 1 is repeated.

4c: If the predicted speedup and type II freeup values of the library M-S TALP and the given M-S TALP, using the same input values, are not within an epsilon of each other and there are no additional stored library M-S TALPs then the quick test is deemed to have failed and the given M-S TALP is assumed to not be in the library of M-S TALPs.

Long Identity Test

If the quick identity test was a success, then additional identity testing can be performed. In the source code of the given M-S TALP, memory allocation value storage is inserted for all memory allocations associated with input variable attributes (creating an annotated given M-S TALP). In addition, the cache memory allocation for cache memory whose allocation is associated with a set of input variable attributes is inserted into the source code of the given M-S TALP. The memory allocation value stored for the annotated given M-S TALP is displayed each time the annotated given M-S TALP is executed.

Varying the input variable attributes that affect memory allocation, the annotated given M-S TALP is executed and the input and displayed stored memory allocation values are used to create a type I freeup. Varying the input variable attributes that affect cache memory allocation, the annotated given M-S TALP is executed and the input and displayed stored cache memory allocation values used to create a type III freeup.

Step 1: The annotated given M-S TALP's type I and type III freeups are compared to the found library M-S TALPs type I and type III freeup.

Step 2: If the type I and type III freeups are within an epsilon of one another then the long identity test is said to have passed and the given M-S TALP is considered equivalent to the library M-S TALP.

Step 3: If the type I and type III freeups are not within an epsilon of one another and there are no additional stored library M-S TALPs then the long identity test is said to have failed. This means that the given M-S TALP is not in the M-S TALP library.

Step 4: If the type I and type III freeups are not within an epsilon of one another and there are additional stored library M-S TALPs then step 1 of the quick identity test is applied again.

Efficiency Testing

Software efficiency can be gauged using memory usage or processing time. If there are two or more M-S TALPs, each generating the same set of output values, time complexity and space complexity can be used to gauge their efficiency for different input variable attribute values.

Single Processing Element (PE) Timing Efficiency: The same set of input variable attributes values that affect time is entered, using the same computer hardware, into the multi-variable versions of the time complexity functions of all M-S TALPs to be tested. The predicted processing times of the M-S TALPs in question are compared. The M-S TALP whose predicted processing time is the smallest is considered the most time efficient for that dataset.

Multiple PE Timing Efficiency: just because an M-S TALP is more time efficient for a given input dataset on a single PE does not mean that the same M-S TALP is the most efficient for that same input dataset using multiple PEs. Using the multi-variable, multi-PE time complexity function and the same input dataset, executing in parallel with the same number of PEs, the M-S TALPs in question are compared. The M-S TALP whose predicted processing time is the smallest is considered the most time efficient for that input dataset using the given number of PEs.

Single PE Memory Efficiency: The same set of input variable attributes values that affect memory allocation are entered, using the same computer hardware, into the multi-variable versions of the type I space complexity functions of all M-S TALPs to be tested. The predicted memory allocations of the M-S TALPs in question are compared. The M-S TALP whose predicted memory allocation is the smallest is considered the most memory efficient for that dataset.

Multiple PE Memory Efficiency: an M-S TALP that is more memory efficient for a given input dataset on a single PE does not mean that the same M-S TALP is the most efficient for that same input dataset using multiple PEs. Using the multi-variable, multi-PE space complexity function and the same input dataset, executing in parallel with the same number of PEs, the M-S TALPs in question are compared. The M-S TALP whose predicted memory allocation is the smallest is considered the most memory efficient for that input dataset using the given number of PEs.

Figure 26:
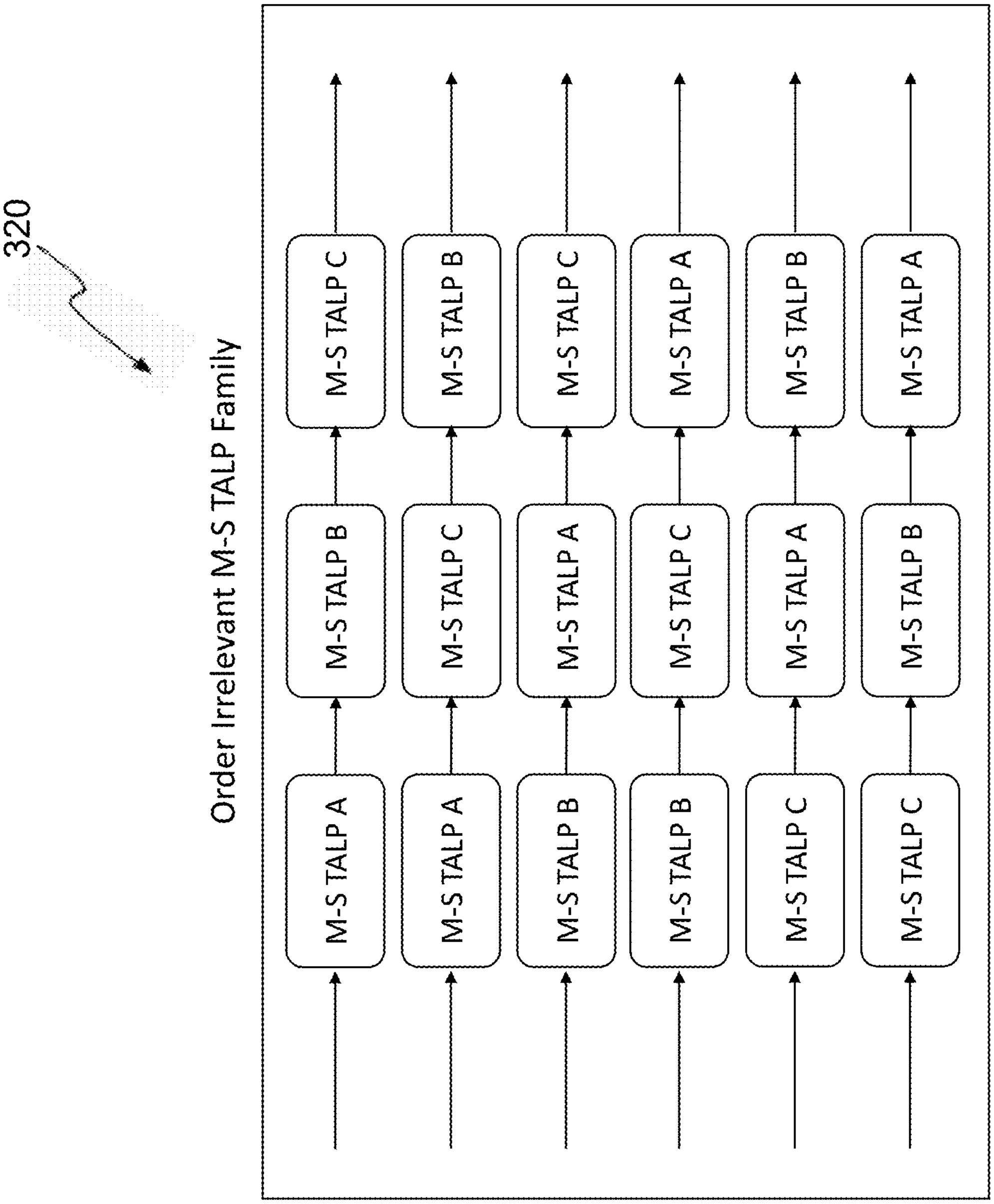
FIG. 26 shows an example of order irrelevant M-S TALPs forming a family of possible M-S TALPs, based on order irrelevant TALPs, in accordance with embodiments of the present invention.

FIG. 26 shows a diagram 320 of an order irrelevant family of linked pathways within an M-S TALP. It has been shown that there are pathways called order irrelevant pathways, where the order in which they are linked does not matter. A family of pathways can be automatically formed that are functionally equal by reordering the linked order irrelevant pathways. The set of permutations for pathways composed of order irrelevant component pathways is called an order irrelevant pathway family. Since the pathways associated with M-S TALPs can also be linked together, the linked pathways might also be order irrelevant.

Figure 27:
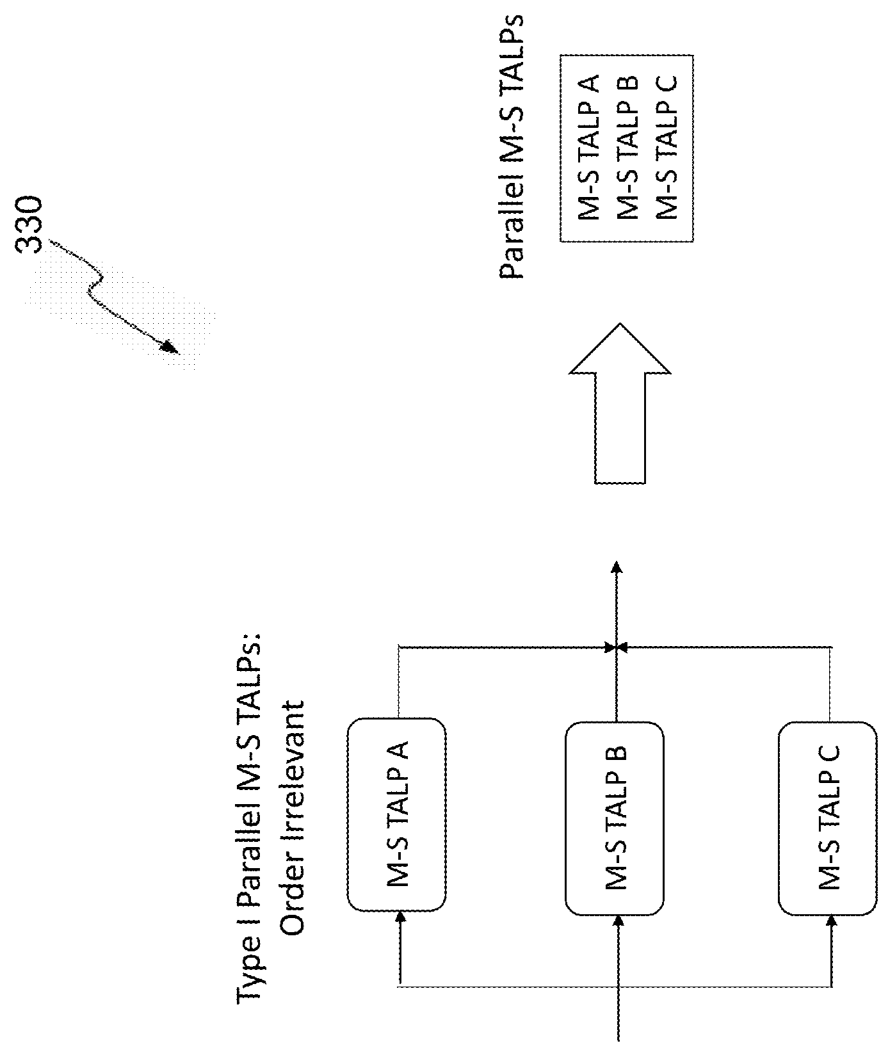
FIG. 27 shows an example of parallelism from multiple order irrelevant M-S TALPs, in accordance with embodiments of the present invention.

FIG. 27 is a diagram 330 showing the conversion of linked order irrelevant pathways within an M-S TALP, without control conditions, to parallel form. Order irrelevance requires that the M-S TALPs are independent of one another and, therefore, do not share input or output variables. These order irrelevant pathways are serially linked in time by one following another. Not sharing input or output variables means that those pathways can be processed simultaneously, analogous to task level parallelism and called pseudo-task parallelism.

Figure 28:
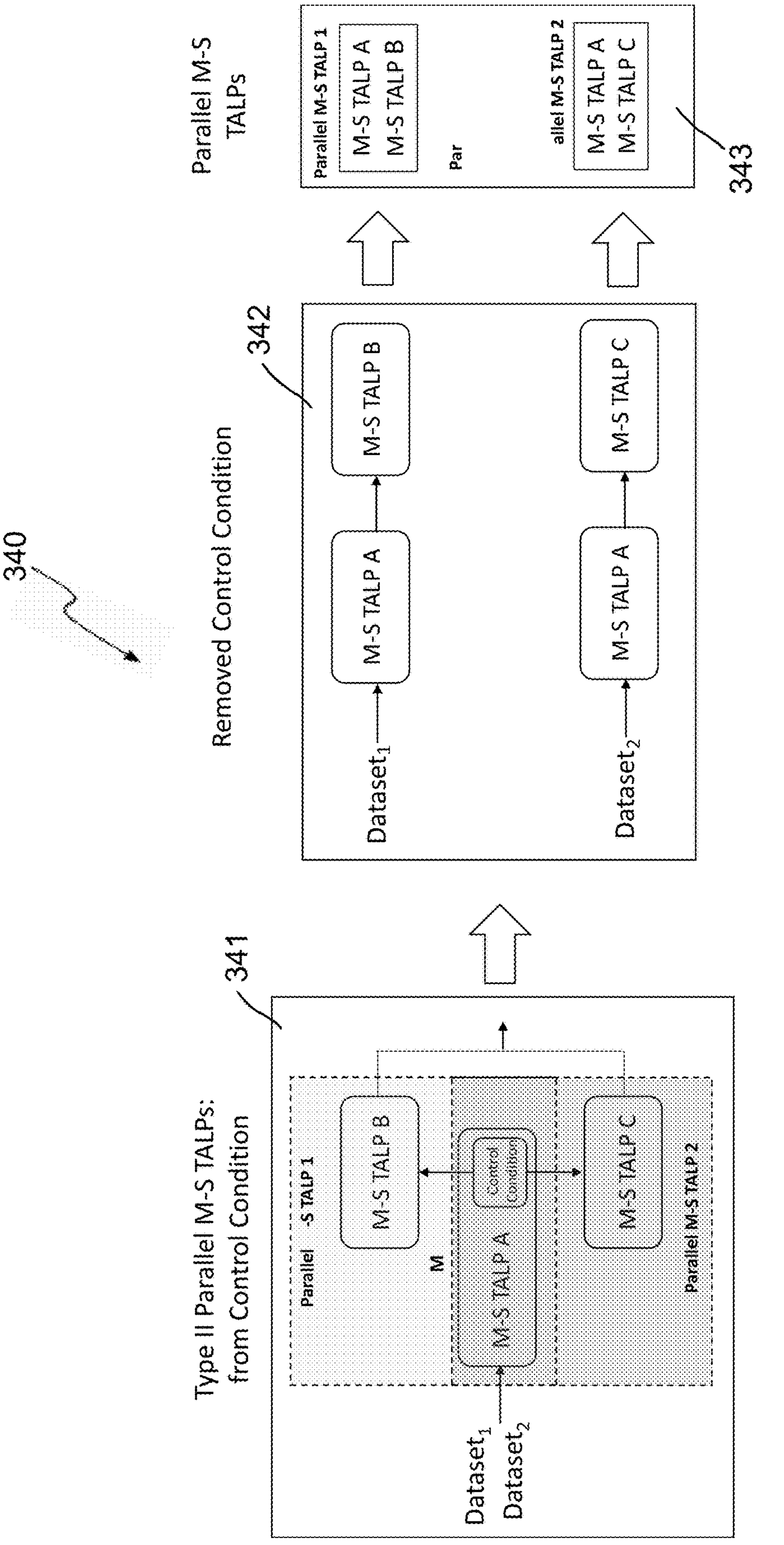
FIG. 28 shows an example of parallelism from two control condition-linked M-S TALPs, in accordance with embodiments of the present invention.

FIG. 28 is a diagram 340 showing the conversion of linked order irrelevant pathways that have control conditions to parallel form. Order irrelevant M-S TALPs can also be linked via a control condition connection 341. The control condition(s) must be removed 342 to produce the same behavior as those connected without any control conditions, that is, to be parallelized 343. To determine if a control condition-linked M-S TALP is order irrelevant, all control conditions are removed by using boundary value analysis to determine the range of input variable values required for that pathway. Once the values are defined, the need for control conditions is eliminated as the pathway is fully defined by the input variables. The M-S TALPs that are linked are then checked for independence. All directly linked independent pathways can be executed in parallel.

Figure 29:
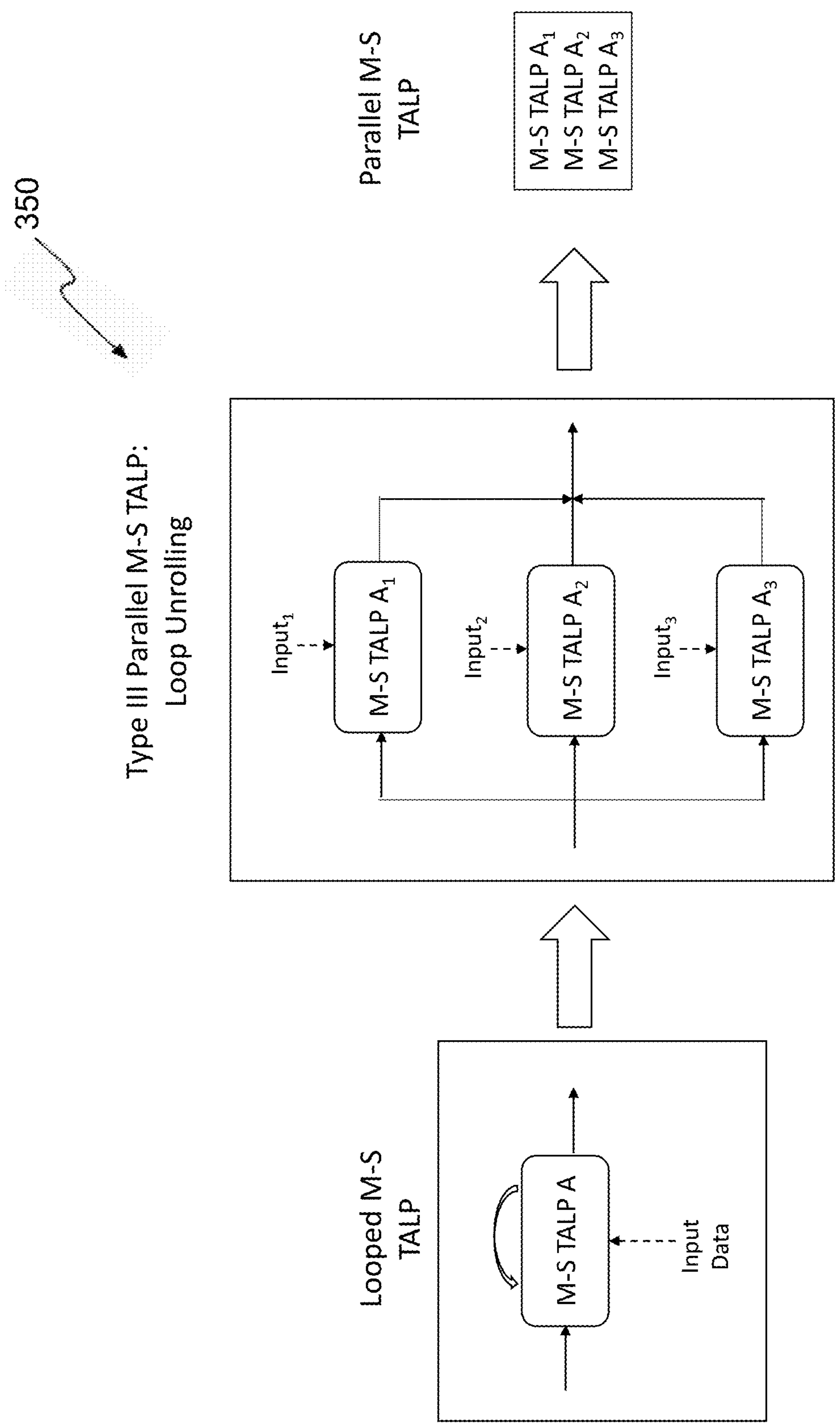
FIG. 29 shows an example of parallelism from M-S TALP loop unrolling, in accordance with embodiments of the present invention.

FIG. 29 is a diagram 350 showing pathway loop unrolling within an M-S TALP. Since a loop is a type of control condition with a repeating pathway, if the variables associated with each instance of the repeating pathways are independent, then each pathway instance can be executed simultaneously.

Figure 30:
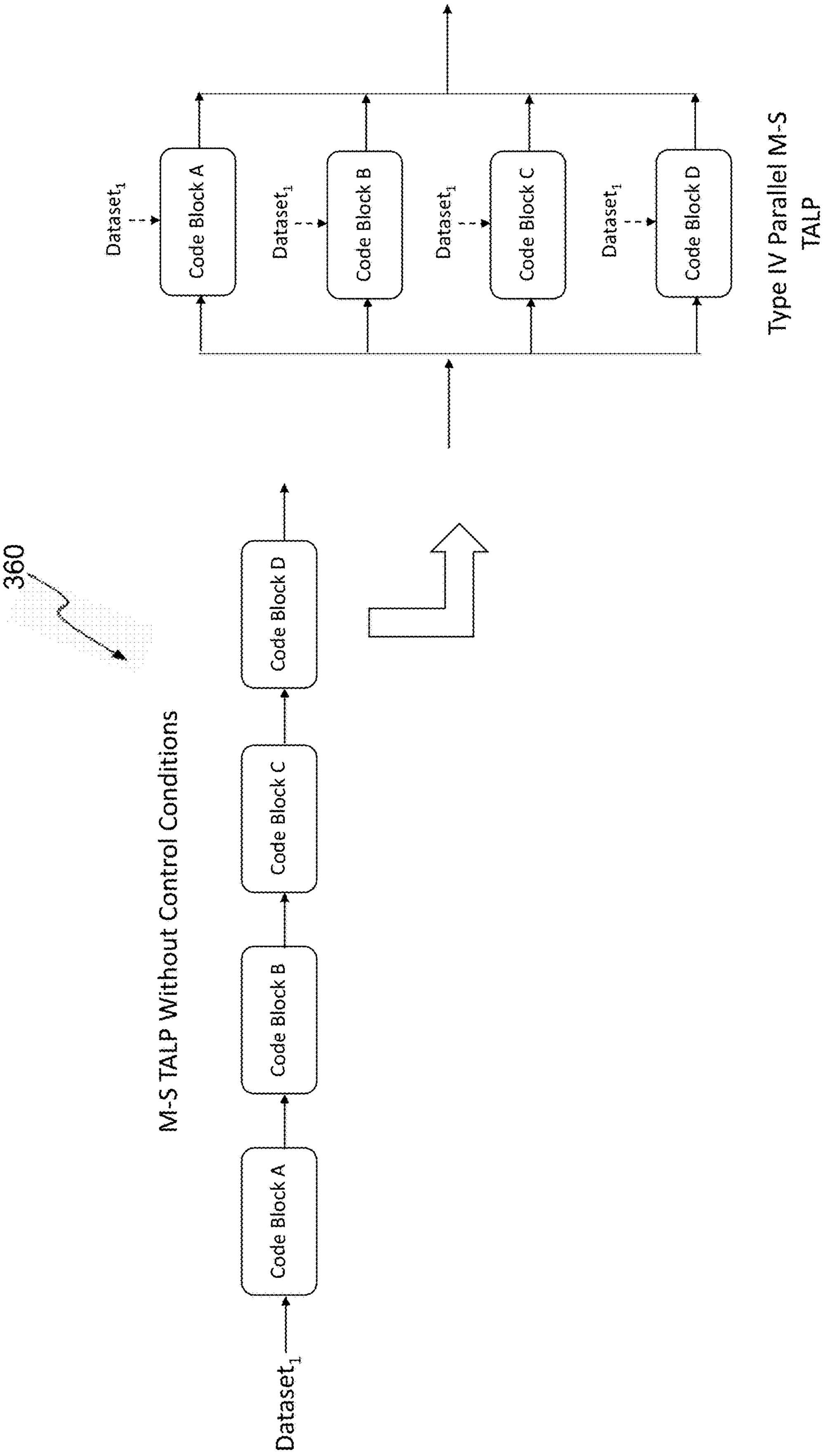
FIG. 30 shows an example of parallelism from an M-S TALP with order independent, linked code blocks, in accordance with embodiments of the present invention.

FIG. 30 is a diagram 360 showing the parallelization of linked independent code blocks within an M-S TALP. Given a set of linked independent code blocks in an M-S TALP, they can be considered parallel code blocks and executed on different PEs in parallel, offering the unique capability of multiple levels of parallelization, both task-like and loop unrolling-like parallelization simultaneously.

Figure 31:
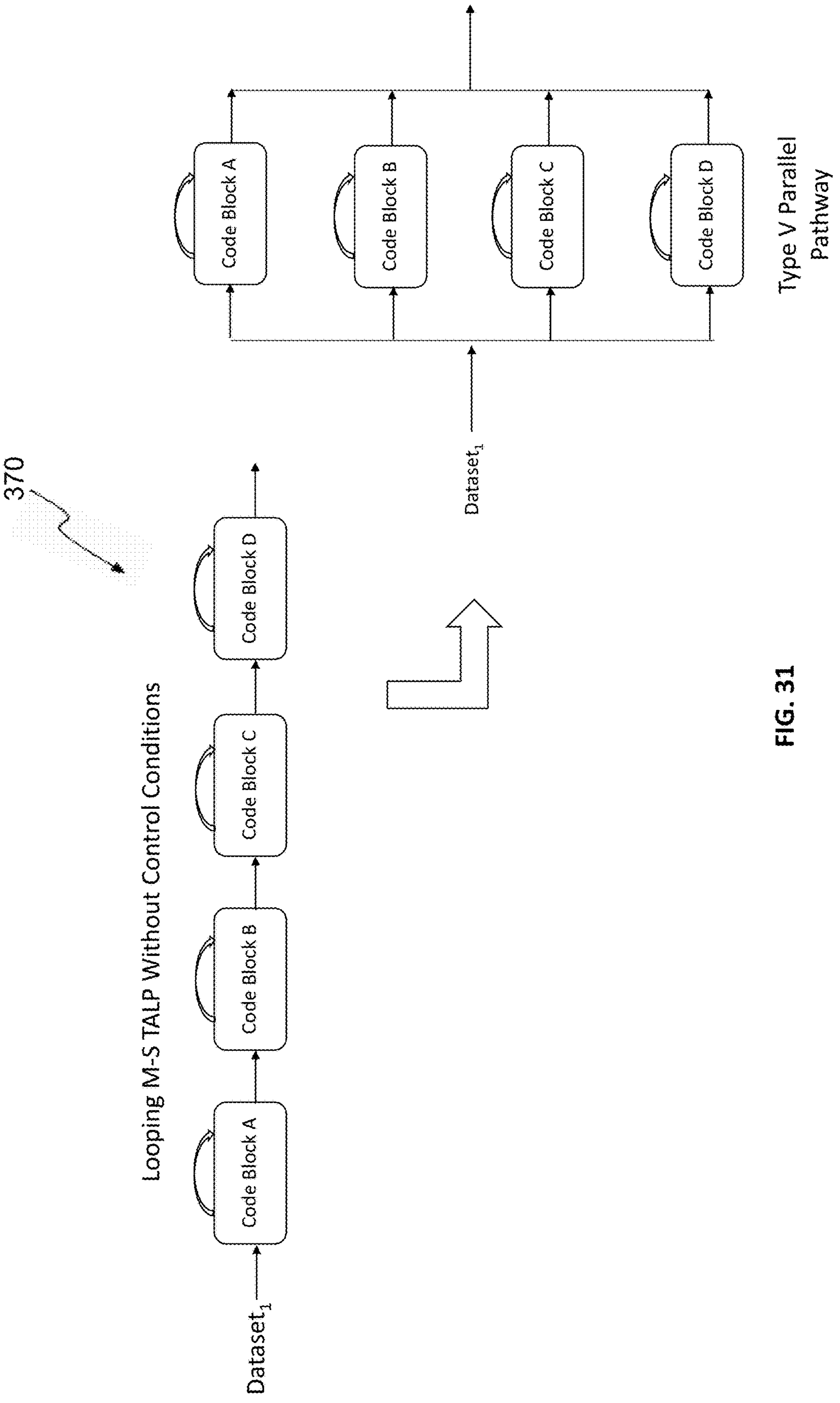
FIG. 31 shows an example of parallelism from an M-S TALP with order independent, linked, looped code blocks, in accordance with embodiments of the present invention.

FIG. 31 is a diagram 370 showing the parallelization of looped, linked, independent code blocks within an M-S TALP. Consider a parallel instance of a single non-looping code block. In order for that code block to be useful in the parallel regime, it would need to process quite a bit of data and have very low parallel overhead. It can be difficult to find multiple connected independent code blocks where each process has enough data such that the parallel effect is noticeable. It is far easier to find multiple independent looping code blocks that can be parallelized.

Figure 32:
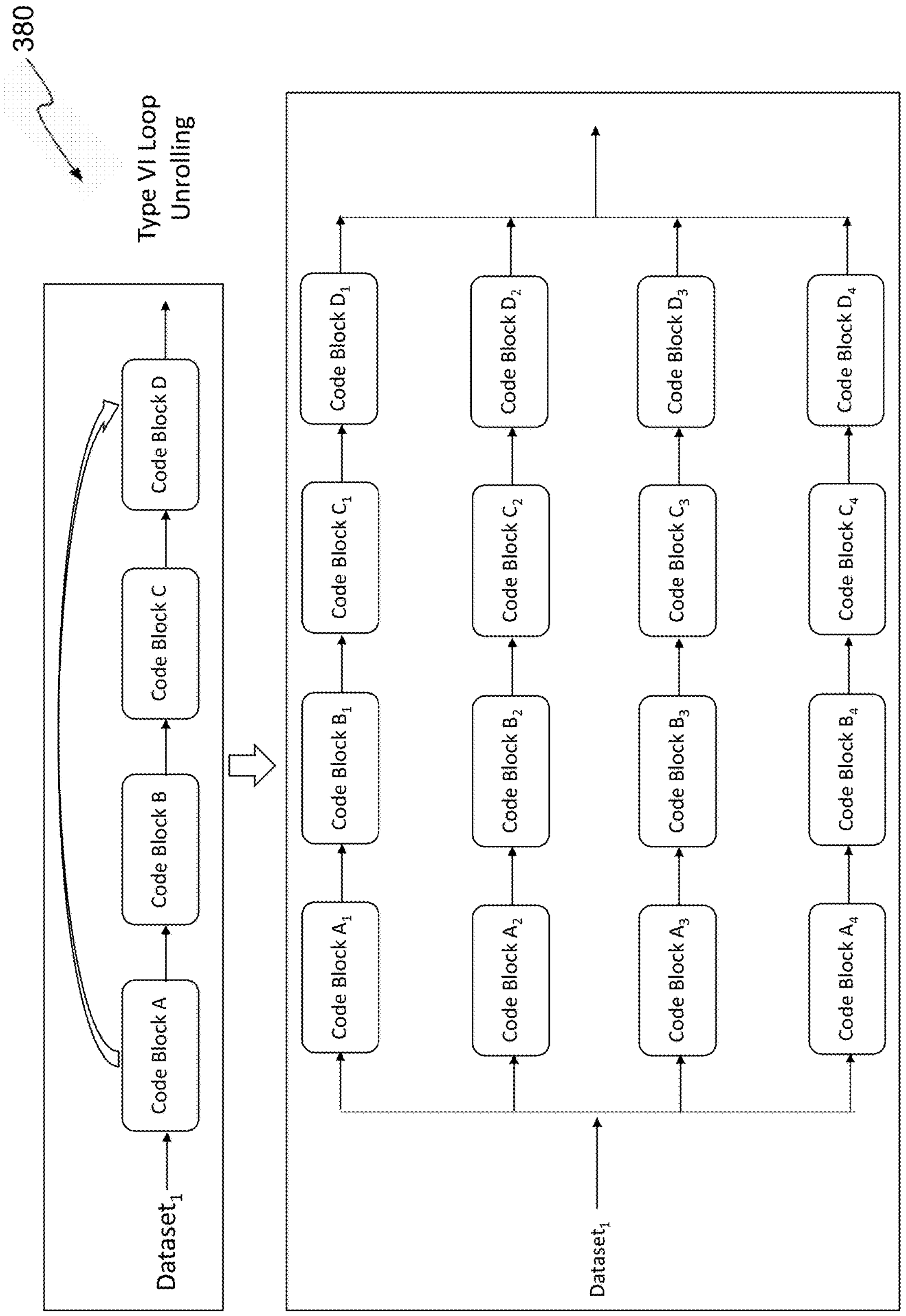
FIG. 32 shows an example of loop unrolling from multiple, order dependent, linked code blocks within an M-S TALP, in accordance with embodiments of the present invention.

FIG. 32 is a diagram 380 showing loop unrolling of dependent code blocks within the looping structure of an M-S TALP. It is easy to determine if a looped code block, whether independent or dependent, contains a sufficient amount of work to parallelize by measuring the time it takes for the loop to process its data in one iteration and multiplying by the number of iterations required to process a given dataset. A looped list of linked dependent code blocks can be parallelized by unrolling the associated loop.

If the initial dataset size of some looping list of dependent code blocks is too small for parallelism, it may still be useful since a looping list can be viewed as a single large independent code block and used as such.

Figure 33:
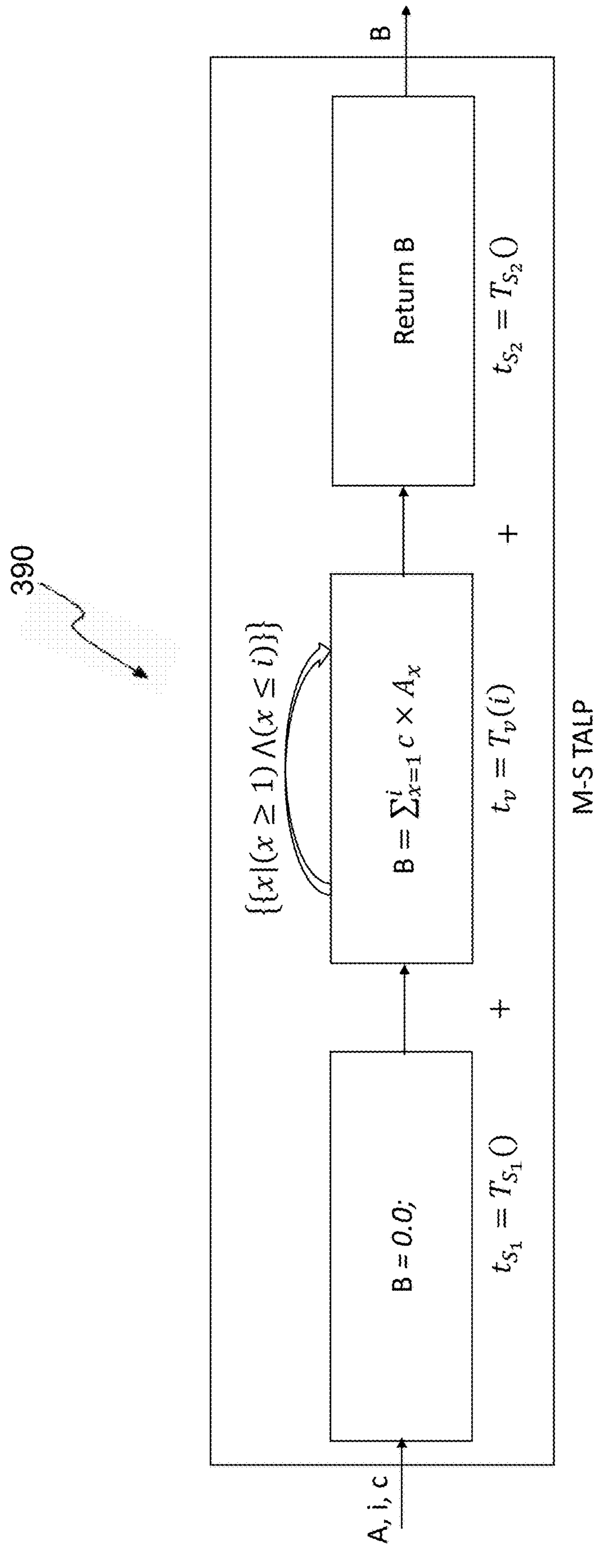
FIG. 33 shows an example of dynamic loop unrolling from order dependent, linked code blocks within a loop whose number of loop iterations vary with input variable attribute values, in accordance with embodiments of the present invention.

FIG. 33 shows a diagram 390 of linked code blocks, one of which has a looping structure whose number of loop iterations vary with a set of input variable attribute values and two of which have no associated looping structures. The processing time for code blocks with looping structures in which the number of loop iterations vary with a set of input variable attribute values is called variable time, and the associated advanced time prediction polynomial is given by $T_v(\ )$. The processing time for code blocks without looping structures in which loop iterations vary with time is called static time, and the associated advanced time prediction polynomial is given by $T_s(\ )$. Thus the total processing time can also be calculated as:

Calculating Processing Time Values using Variable and Static Time Complexity — Equation 35

$$t = \left(T_v\left(\frac{i_{1_v}}{i_{n_v}}\right) \times i_{n_v}\right) + \left(T_s\left(\frac{i_{1_s}}{i_{n_s}}\right) \times i_{n_s}\right)$$

Figure 34:
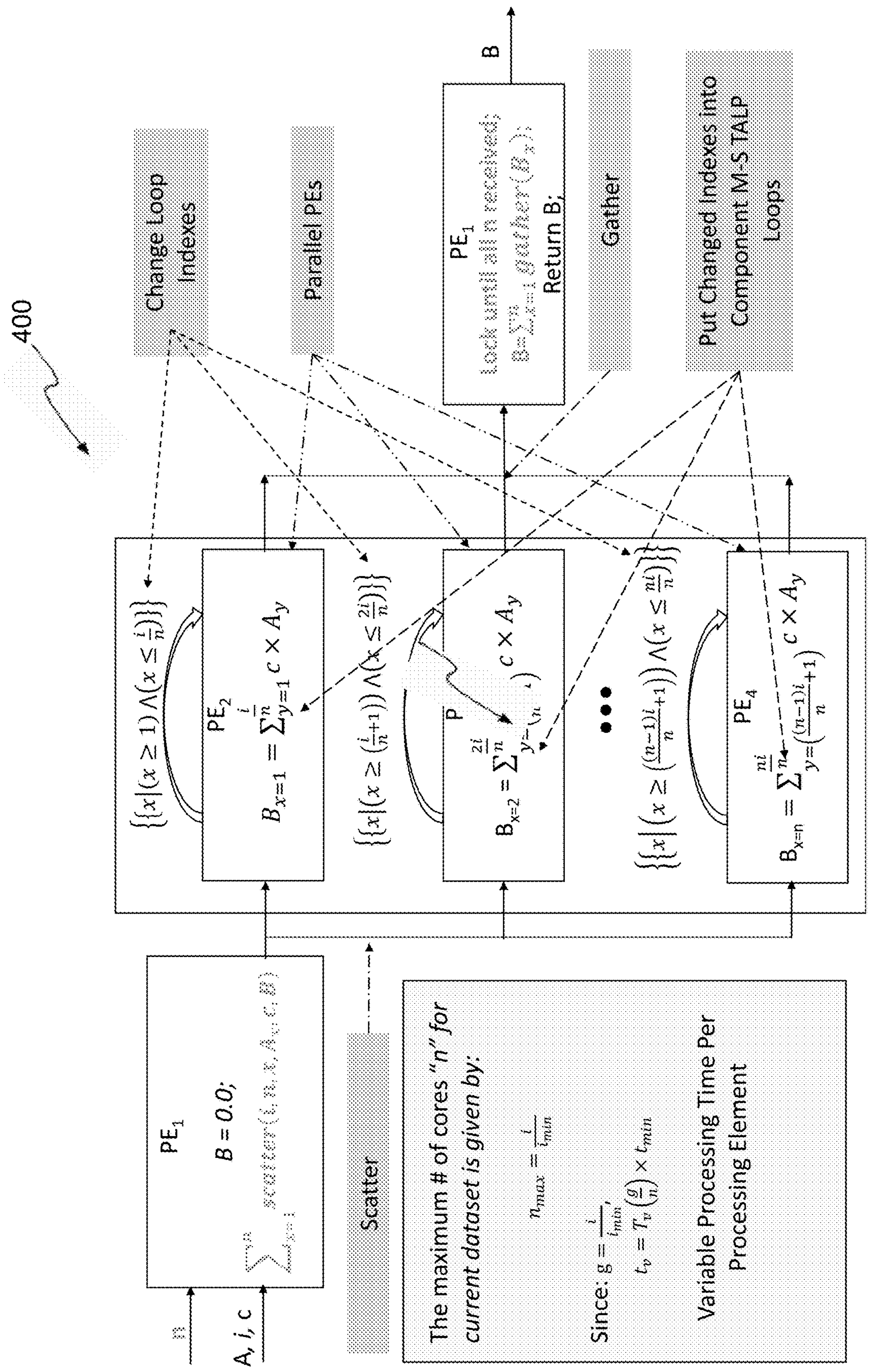
FIG. 34 shows an example of complete M-S TALP parallelization using scatter/gather functions, thread lock functions, and dynamic loop unrolling, in accordance with embodiments of the present invention.

FIG. 34 is a diagram 400 of an M-S TALP that has been automatically parallelized to spread across multiple processing elements. It is possible to change an M-S TALP pathway such that the number of PEs can automatically vary in response to the input variable attributes that affect loop iteration changes. An example of a simple pathway with a single looping structure, single input variable attribute that affects the number of loop iterations, i, and the associated advanced time prediction polynomial is shown. This pathway example shows parallelization using time complexity, dynamic loop unrolling, thread lock functions, and scatter/gather function call locations.

Figure 35:
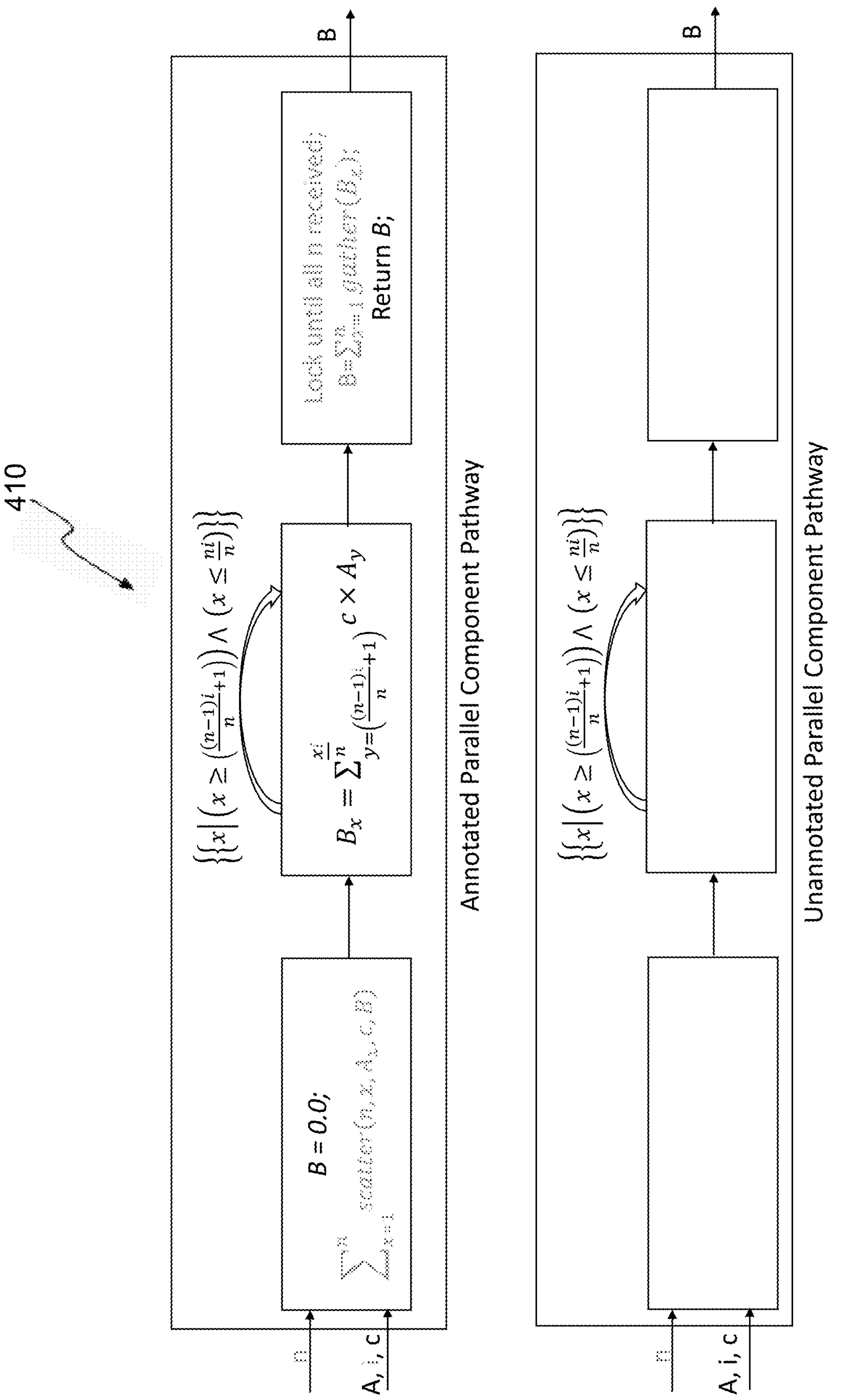
FIG. 35 shows a simplified diagram depicting dynamic loop unrolling without all the details, an example of simplified notation describing complete parallelization, in accordance with embodiments of the present invention.

FIG. 35 shows a simplified diagram 410 depicting dynamic loop unrolling without all the details. The use of dynamic loop unrolling-based parallel processing does not have to show multiple PEs and their associated loop starting and ending calculations, thread lock functions or scatter/gather function call locations in order to indicate that dynamic loop unrolling is used.

Figure 36:
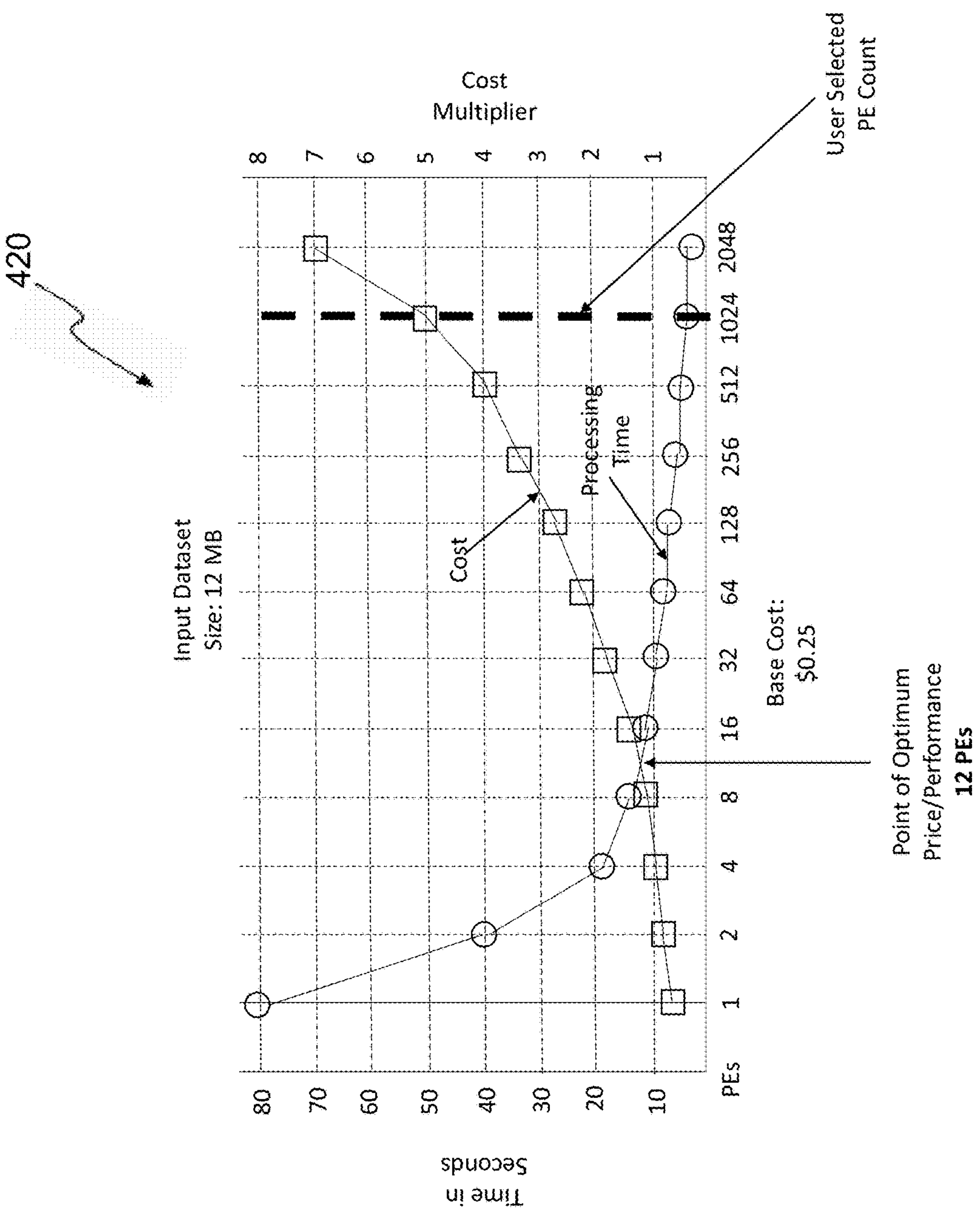
FIG. 36 shows an example of a price performance graph for various predicted processing times based on the number of processing elements used, in accordance with embodiments of the present invention.

FIG. 36 shows a price performance graph 420 of an M-S TALP with associated analytics that are able to determine the processing performance and number of PEs prior to executing the M-S TALP. The selection of the number of PEs to be used prior to the execution of the M-S TALP directly changes the number of loop iterations performed by the M-S TALP, which changes the processing time of the M-S TALP. This allows the user to optimize the use of the system as a function of cost and benefit.

Figure 37:
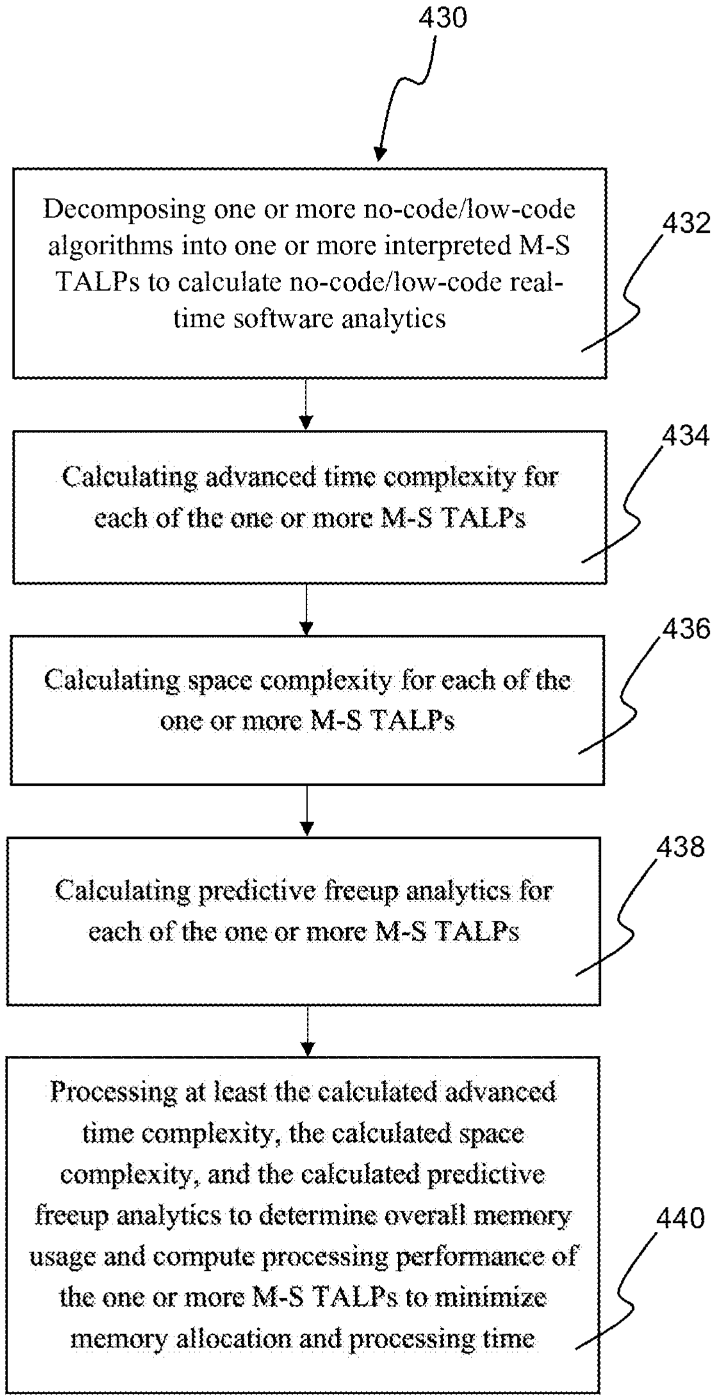
FIG. 37 is a flow diagram of a method of decomposing interpreted no-code/low-code algorithms for enhancement on a selected computing platform, wherein the method comprises decomposing one or more no-code/low-code algorithms into one or more interpreted M-S TALPs, calculating advanced time complexity for each of the one or more M-S TALPs, calculating space complexity for each of the one or more M-S TALPs, calculating predictive freeup analytics for each of the one or more M-S TALPs, and processing at least the calculated advanced time complexity, the calculated space complexity, and the calculated predictive freeup analytics to determine overall memory usage and compute processing performance of the one or more M-S TALPs to minimize memory allocation and processing time.

Referring to FIG. 37, with this and other concepts, systems, and methods of the present invention, a method 430 of decomposing interpreted no-code/low-code algorithms for enhancement on a selected computing platform comprises decomposing one or more no-code/low-code algorithms into one or more interpreted M-S TALPs to calculate no-code/low-code real-time software analytics (step 432), calculating advanced time complexity for each of the one or more M-S TALPs (step 434), calculating space complexity for each of the one or more M-S TALPs (step 436), calculating predictive freeup analytics for each of the one or more M-S TALPs (step 438), and processing at least the calculated advanced time complexity, the calculated space complexity, and the calculated predictive freeup analytics to determine overall memory usage and compute processing performance of the one or more M-S TALPs to minimize memory allocation and processing time (step 440).

In various embodiments, the one or more interpreted M-S TALPs are stored in or accessed from a library database using M-S TALP identification.

In various embodiments, the system or method further comprises receiving one or more of data packets, data streams, and message packets at a named ports input manager component.

In various embodiments, the system or method further comprises receiving activation process data at an output buffer component.

In various embodiments, the system or method further comprises receiving outputted data from the output buffer component at a named ports output manager component.

In various embodiments, the system or method further comprises generating one or more execution pathways through the one or more interpreted no-code/low-code algorithms to build one or more polynomials that approximate the advanced time complexity, the space complexity, and the predictive freeup analytics for each of the one or more interpreted M-S TALPs.

In various embodiments, the system or method further comprises constructing a process-calling map by linking processes of a markup language or script.

In various embodiments, the selected computing platform is a stand-alone computing platform.

In various embodiments, the selected computing platform is a centralized client-server platform.

In various embodiments, the selected computing platform is a decentralized cloud-based platform.

In various embodiments, the selected computing platform is a decentralized ad hoc platform.

In various embodiments, the selected computing platform is a decentralized peer-to-peer ad hoc platform.

In various embodiments, the system or method further comprises decomposing DAG workflows into one or more sets of STALPs before decomposing the one or more interpreted no-code/low-code algorithms into the one or more M-S TALPs.

In one or more embodiments, from the perspective of a software computing system to decompose interpreted no-code/low-code algorithms for enhancement on a selected computing platform, the system comprises a memory operatively connected to one or more computing processors or processing elements, wherein the one or more processors or processing elements are configured to execute program code to: (i) decompose one or more no-code/low-code algorithms into one or more interpreted M-S TALPs to calculate no-code/low-code real-time software analytics; (ii) calculate advanced time complexity for each of the one or more M-S TALPs; (iii) calculate space complexity for each of the one or more M-S TALPs; (iv) calculate predictive freeup analytics for each of the one or more M-S TALPs; and (v) process at least the calculated advanced time complexity, the calculated space complexity, and the calculated predictive freeup analytics to determine overall memory usage and compute processing performance of the one or more M-S TALPs to minimize memory allocation and processing time.

All references and publications referenced or identified above are hereby fully incorporated herein into the written specification by reference.

It will be recognized by one skilled in the art that operations, functions, algorithms, logic, method steps, routines, sub-routines, and modules may be implemented in software, in firmware, in special purpose digital logic, and any combination thereof without deviating from the spirit and scope of the present invention as recited within the claims attached hereto.

The present invention may be embodied in other specific forms without departing from the spirit or essential attributes thereof, and it is, therefore, desired that the present embodiment be considered in all respects as illustrative and not restrictive. Similarly, the above-described methods, steps, apparatuses, and techniques for providing and using the present invention are illustrative processes and are not intended to be limited to those specifically defined herein. Further, features and aspects, in whole or in part, of the various embodiments described herein can be combined to form additional embodiments within the scope of the invention even if such combination is not specifically described herein.

For purposes of interpreting the claims for the present invention, it is expressly intended that the provisions of Section 112(f) of 35 U.S.C. are not to be invoked unless the specific terms "means for" or "step for" are recited in a claim.

What is claimed is:

1. A method of decomposing interpreted no-code/low-code algorithms for enhancement on a selected computing platform, comprising:

automatically decomposing a software module into parallelized no-code/low-code algorithms;

automatically converting the parallelized no-code/low-code algorithms into markup or scripting language time-affecting linear pathways (M-S TALPs);

determining a number of processing elements (PEs) for execution of the M-S TALPs;

executing the M-S TALPs in parallel with the determined number of PEs, determining software time and space analytics for the parallelized no-code/low-code algorithms by:

calculating advanced time complexity for each of the M-S TALPs;

calculating space complexity for each of the M-S TALPs;

calculating predictive freeup analytics for each of the M-S TALPs;

processing at least the calculated advanced time complexity, the calculated space complexity, and the calculated predictive freeup analytics to determine overall memory usage and compute processing performance of the M-S TALPs; and based on the determined overall memory usage and compute processing performance, optimizing memory allocation and processing time of the M-S TALPs.

2. The method of claim 1, wherein the M-S TALPs are stored in or accessed from a library database using M-S TALP identification.

3. The method of claim 1, further comprising receiving one or more of data packets, data streams, and message packets at a named ports input manager component.

4. The method of claim 1, further comprising receiving activation process data at an output buffer component.

5. The method of claim 4, further comprising receiving outputted data from the output buffer component at a named ports output manager component.

6. The method of claim 1, further comprising generating one or more execution pathways through the parallelized no-code/low-code algorithms to build one or more polynomials that approximate the advanced time complexity, the space complexity, and the predictive freeup analytics for each of the M-S TALPs.

7. The method of claim 1, further comprising constructing a process-calling map by linking processes of a markup language or script.

8. The method of claim 1, wherein the selected computing platform is a stand-alone computing platform.

9. The method of claim 1, wherein the selected computing platform is a centralized client-server platform.

10. The method of claim 1, wherein the selected computing platform is a decentralized cloud-based platform.

11. The method of claim 1, wherein the selected computing platform is a decentralized ad hoc platform.

12. The method of claim 1, wherein the selected computing platform is a decentralized peer-to-peer ad hoc platform.

13. The method of claim 1, further comprising decomposing directed acyclic graph (DAG) workflows into one or more sets of task parallel simple loopless time-affecting linear pathways (STALPs) before decomposing the parallelized no-code/low-code algorithms into the M-S TALPs.

14. A software system of decomposing interpreted no-code/low-code algorithms for enhancement on a selected computing platform, comprising:

a memory; and one or more processors operatively coupled with the memory, wherein the one or more processors are configured to execute program code to:

automatically decompose a software module into parallelized no-code/low-code algorithms;

automatically convert the parallelized no-code/low-code algorithms into markup or scripting language time-affecting linear pathways (M-S TALPs);

determine a number of processing elements (PEs) for execution of the M-S TALPs;

execute the M-S TALPs in parallel with the determined number of PEs, and determine software time and space analytics for the parallelized no-code/low-code algorithms by:

calculating advanced time complexity for each of the M-S TALPs;

calculating space complexity for each of the M-S TALPs;

calculating predictive freeup analytics for each of the M-S TALPs;

processing at least the calculated advanced time complexity, the calculated space complexity, and the calculated predictive freeup analytics to determine overall memory usage and compute processing performance of the M-S TALPs; and based on the determined overall memory usage and compute processing performance, optimizing memory allocation and processing time of the M-S TALPs.

15. The system of claim 14, wherein the one or more processors are further configured to execute the program code to receive one or more of data packets, data streams, and message packets at a named ports input manager component.

16. The system of claim 14, wherein the one or more processors are further configured to execute the program code to receive activation process data at an output buffer component.

17. The system of claim 16, wherein the one or more processors are further configured to execute the program code to receive outputted data from the output buffer component at a named ports output manager component.

18. The system of claim 14, wherein the one or more processors are further configured to execute the program code to generate one or more execution pathways through the parallelized no-code/low-code algorithms to build one or more polynomials that approximate the advanced time complexity, the space complexity, and the predictive freeup analytics for each of the M-S TALPs.

19. The system of claim 14, wherein the selected computing platform is one of a stand-alone computing platform, a centralized client-server platform, a decentralized cloud-based platform, a decentralized ad hoc platform, and a decentralized peer-to-peer ad hoc platform.

20. The system of claim 14, wherein the one or more processors are further configured to execute the program code to decompose directed acyclic graph (DAG) workflows into one or more sets of task parallel simple loopless time-affecting linear pathways (STALPs) before decomposing the parallelized no-code/low-code algorithms into the M-S TALPs.

* * * * *